United States Patent
Shimizu

(10) Patent No.: US 8,002,633 B2
(45) Date of Patent: Aug. 23, 2011

(54) GAME APPARATUS, GAME SYSTEM, AND STORING MEDIUM STORING GAME PROGRAM IN WHICH DISPLAY IS DIVIDED BETWEEN PLAYERS

(75) Inventor: Hideaki Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2322 days.

(21) Appl. No.: 10/763,159

(22) Filed: Jan. 26, 2004

(65) Prior Publication Data
US 2004/0152513 A1 Aug. 5, 2004

(30) Foreign Application Priority Data
Jan. 27, 2003 (JP) ................ 2003-016880

(51) Int. Cl.
*A63F 13/00* (2006.01)
*A63F 9/24* (2006.01)
*A63F 13/10* (2006.01)

(52) U.S. Cl. ........ 463/31; 463/7; 463/30; 463/33; 273/317.1; 345/619; 345/660; 345/670; 345/671; 715/788; 715/798; 715/801

(58) Field of Classification Search ........ 463/36–39, 463/40–43, 1–5, 7–9, 30–34, 49–57; 273/108.1, 273/127 R, 148 R, 148 B, 309, 317.1, 340, 273/348, 361–367; 345/1.1–3.4, 156, 157, 345/160, 419, 473–475, 618–619, 629, 660–671; 717/168–178; 348/37, 119, 141–142, 240.99, 348/E13.022–E13.027, E13.036; 434/115, 434/117, 118, 211; 715/706, 738, 757–759, 715/762–764, 766, 781–783, 788, 794–795, 798, 801–802, 807

See application file for complete search history.

(56) References Cited

U.S. PATENT DOCUMENTS

| | | | | |
|---|---|---|---|---|
| 4,672,541 A | * | 6/1987 | Bromley et al. ............ | 463/3 |
| 4,890,098 A | * | 12/1989 | Dawes et al. .............. | 715/800 |
| 5,060,170 A | * | 10/1991 | Bourgeois et al. .......... | 715/788 |
| 5,356,156 A | * | 10/1994 | Suzuki et al. .............. | 463/31 |
| 5,390,295 A | * | 2/1995 | Bates et al. ............... | 715/789 |
| 5,405,151 A | * | 4/1995 | Naka et al. ............... | 463/31 |
| 5,825,432 A | * | 10/1998 | Yonezawa ................. | 348/563 |
| 5,879,235 A | * | 3/1999 | Kaneko et al. ............. | 463/34 |
| 5,963,199 A | | 10/1999 | Kato et al. | |
| 5,971,855 A | * | 10/1999 | Ng .......................... | 463/42 |

(Continued)

FOREIGN PATENT DOCUMENTS

JP 11-137838 5/1999

(Continued)

*Primary Examiner* — Arthur O. Hall
(74) *Attorney, Agent, or Firm* — Nixon & Vanderhye PC

(57) ABSTRACT

A game apparatus that includes a CPU and in which a plurality of players participate and play a game on a display screen displayed on a common display device. A display area is divided by the number of participating players, and the divided areas are allotted to each player. In addition, an evaluating value is set according to a superiority or inferiority situation of a play content of each player, a size of the divided areas are changed based on the evaluating value, and the display screen in correspondence with a change of the divided areas is generated and displayed. Furthermore, when there is a player who reaches game-over, the display area is re-divided by the number of remaining players.

15 Claims, 20 Drawing Sheets

U.S. PATENT DOCUMENTS

| | | | |
|---|---|---|---|
| 6,057,842 A * | 5/2000 | Knowlton et al. | 715/788 |
| 6,347,994 B1 * | 2/2002 | Yoshikawa et al. | 463/7 |
| 6,478,679 B1 | 11/2002 | Himoto et al. | |
| 6,527,637 B2 * | 3/2003 | Fujioka et al. | 463/4 |
| 6,608,633 B1 * | 8/2003 | Sciammarella et al. | 715/700 |
| 6,966,837 B1 * | 11/2005 | Best | 463/33 |
| 7,146,573 B2 * | 12/2006 | Brown et al. | 715/802 |
| 2002/0097229 A1 | 7/2002 | Rose et al. | |
| 2002/0165028 A1 * | 11/2002 | Miyamoto et al. | 463/46 |
| 2003/0092493 A1 | 5/2003 | Shimizu et al. | |
| 2003/0181241 A1 * | 9/2003 | Oakes et al. | 463/40 |
| 2004/0147314 A1 | 7/2004 | LeMay et al. | |
| 2004/0201545 A1 | 10/2004 | Yamazaki et al. | |
| 2004/0222995 A1 | 11/2004 | Colle | |
| 2004/0268397 A1 | 12/2004 | Dunbar et al. | |
| 2005/0009607 A1 | 1/2005 | Russell et al. | |
| 2005/0015731 A1 | 1/2005 | Mak et al. | |
| 2005/0062726 A1 | 3/2005 | Marsden et al. | |
| 2005/0071887 A1 | 3/2005 | Yoshida | |
| 2005/0099408 A1 | 5/2005 | Seto et al. | |
| 2005/0164784 A1 | 7/2005 | Yamamoto et al. | |
| 2006/0100021 A1 | 5/2006 | Yoshino et al. | |
| 2006/0128468 A1 | 6/2006 | Yoshikawa et al. | |
| 2006/0178188 A1 | 8/2006 | LeMay et al. | |

FOREIGN PATENT DOCUMENTS

| | | |
|---|---|---|
| JP | 2000-259134 | 9/2000 |
| JP | 2001-70647 | 3/2001 |
| JP | 2002-28369 | 1/2002 |
| JP | 2002-239251 | 8/2002 |
| JP | 3378801 | 12/2002 |

* cited by examiner

AT A TIME OF STARTING GAME (IN CASE OF 2-PERSON PLAY)

- AREA OF DISPLAY AREA = 180
- EVALUATING VALUE OF PLAYERS (1, 2) = 1
- AREA OF DIVIDED AREAS OF PLAYERS (1, 2) = (1/2) × 180 = 90

WHEN PLAYER 1 TAKES CARD

- AREA OF DISPLAY AREA = 180
- EVALUATING VALUE OF PLAYER 1 = 1.5
- EVALUATING VALUE OF PLAYER 2 = 1
- AREA OF DIVIDED AREA OF PLAYER 1 = (1.5/2.5) × 180 = 108
- AREA OF DIVIDED AREA OF PLAYER 2 = (1/2.5) × 180 = 72

STATE IN WHICH PLAYER 1 FACILITATES THE GAME ADVANTAGEOUSLY

AT A TIME OF STARTING GAME (IN CASE OF 4-PERSON PLAY)

- AREA OF DISPLAY AREA = 180
- EVALUATING VALUES OF PLAYERS (1, 2, 3, 4) = 1
- AREA OF DIVIDED AREAS OF PLAYERS (1, 2, 3, 4) = (1/4) × 180 = 45

AT A TIME OF STARTING GAME (IN CASE OF 3-PERSON PLAY)

- EVALUATING VALUE OF PLAYERS (1, 2, 3) = 1
- CENTER ANGLE OF DIVIDED AREAS OF PLAYERS (1, 2, 3)
  = (1/3) × 360°
  = 120°

FIG. 14

IN CASE THAT PLAYER 2 DEFEATS ENEMY

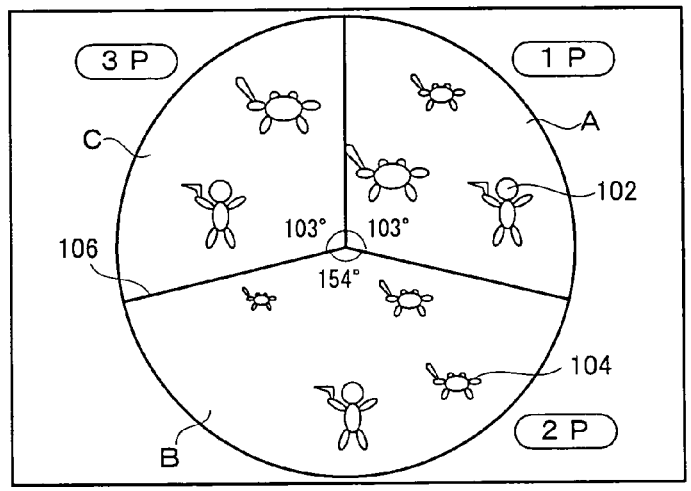

- EVALUATING VALUES OF PLAYERS (1, 3) = 1
- EVALUATING VALUE OF PLAYER 2 = 1.5
- CENTER ANGLE OF DIVIDED AREAS OF PLAYERS (1, 3)
  = (1/3.5) × 360°
  = APPROXIMATELY 103°
- CENTER ANGLE OF DIVIDED AREA OF PLAYER 2
  = (1.5/3.5) × 360°
  = APPROXIMATELY 154°

FIG. 15

STATE IN WHICH PLAYER 2 FACILITATES GAME ADVANTAGEOUSLY

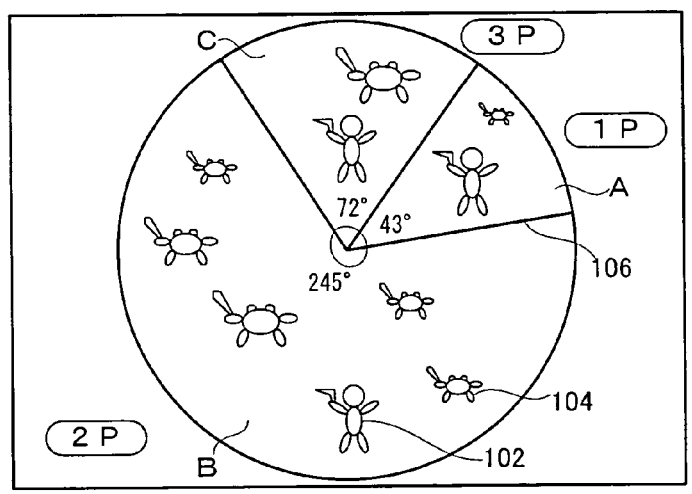

- EVALUATING VALUE OF PLAYER 1 = 3
- EVALUATING VALUE OF PLAYER 2 = 17
- EVALUATING VALUE OF PLAYER 3 = 5
- CENTER ANGLE OF PLAYER 1
  = (3/25) × 360°
  = APPROXIMATELY 43°
- CENTER ANGLE OF PLAYER 2
  = (17/25) × 360°
  = APPROXIMATELY 245°
- CENTER ANGLE OF PLAYER 3
  = (5/25) × 360°
  = 72°

IN CASE PLAYER 1 IS GAME-OVER

- EVALUATING VALUE OF PLAYER 2 = 17
- EVALUATING VALUE OF PLAYER 3 = 5
- CENTER ANGLE OF PLAYER 2
  = (17/22) × 360°
  = APPROXIMATELY 278°
- CENTER ANGLE OF PLAYER 3
  = (5/22) × 360°
  = APPROXIMATELY 82°

EXCHANGING PROCESS ON VIDEO GAME MACHINE SIDE

GAME APPARATUS, GAME SYSTEM, AND STORING MEDIUM STORING GAME PROGRAM IN WHICH DISPLAY IS DIVIDED BETWEEN PLAYERS

This application claims the benefit of JP 2003-16880, filed on Jan. 27, 2003, the entire contents of which are hereby incorporated herein.

BACKGROUND OF THE INVENTION

1. Field of the Invention

The present invention relates to a game apparatus, a game system, and a storing medium storing a game program. More specifically, the present invention relates to a game apparatus, a game system, and a storing medium storing a game program in which a plurality of players participate and play a game on a game screen displayed on a common display, and the game screen is divided into a plurality of areas for each player in correspondence with the number of the players.

2. Description of the Prior Art

One example of a kind of conventional game apparatus is disclosed in Japanese Patent Laying-open No. 2001-70647 (hereinafter referred to as a prior art 1). In an amusement apparatus of the prior art 1, in a battle-type shooting game, a screen is divided into two portions, that is, upper and lower portions, and in each of the upper and lower areas, characters of each player are arranged in a divided manner. Furthermore, by interchanging the areas in which the players' own characters are displayed by each turn, a fairness of a playing condition is provided, for example.

Furthermore, although not related to a game that a plurality of players participate and play (multiplayer-type game), an example of an art, which is related to a desktop game in which one player and a computer compete with each other, and a display screen is divided into a plurality of areas and displayed, is disclosed in Japanese Patent Laying-open No. 2002-28369 (hereinafter referred to as a prior art 2). In a three-dimensional display apparatus of the desktop game of the prior art 2, in a Mahjong (a popular Chinese tile game) game, for example, ordinary tiles (tiles distributed among players) and discarded tiles (discarded tiles, not used any more) of the player are displayed in different areas. In addition, by arbitrarily setting a ratio, a visual range, and a viewing angle between each area, and displaying each area, it becomes easy to see. This enables game play to have an actual battling sensation.

In the prior art 1, a size of the divided areas is fixed, and the areas in which each player character is displayed are interchanged. That is, the divided areas are not changed depending on a superiority or inferiority of the play content of each player. Therefore, there is a problem that it is difficult to comprehend the superiority or inferiority of each player, and, therefore, the game is not as fun as it otherwise could be.

It is noted that in the prior art 2, although the ratio of each area is arbitrarily set by the player for the sake of easy viewing by a single player, the prior art 2 is not intended for the multiplayer-type game. Therefore, there is the same problem as in the prior art 1 in that the game is not changed depending on the superiority or inferiority of the play content of each player.

SUMMARY OF THE INVENTION

Therefore, it is a primary object of the present invention to provide a novel game apparatus, a game system, and a storing medium that stores a game program.

It is another object of the present invention to provide a game apparatus, a game system, and a storing medium that stores a game program capable of easily comprehending a superiority or inferiority situation of a play content of each player in a multiplayer-type game.

A game apparatus according to a preferred embodiment of the present invention is a game apparatus that is provided to be associated with a display means, and a plurality of players participate and play a game on a display screen displayed on the display means. The game apparatus comprises: a game program storing means; an operating means; a number-of-players detecting means; a screen dividing means; a game image generating means; an evaluating value setting means; and a size changing means. The game program storing means stores a game program. The operating means is operated by the player. The number-of-players detecting means detects the number of players who participate in the game. The screen dividing means divides a display area included in the display screen by the number of the participating players, and forms a plurality of divided areas. The game image generating means generates game images in each of the divided areas allotted to each player based on the game program and an operation from the operating means. The evaluating value setting means sets an evaluating value of each player according to the superiority or inferiority of the play content of each player. Furthermore, the size changing means changes a size of the divided areas allotted to each player based on the evaluating value.

More specifically, the game apparatus or a game machine (12) is provided to be associated with a display means (34), and constructed in such a manner that a plurality of players participate and play a game on a display screen displayed on the display means. The game program storing means includes a main memory (40) and an optical disk (18), and the game program is stored therein. The operating means (26) is operated by the player, and in this game machine, the game is facilitated based on the game program and an operating signal from the operating means (26). The number-of-players detecting means (36, 80, S5, S45) detects the number of players who participate in the game. The screen dividing means (36, 82, S11, S53) divides a display area by the number of the participating players, and forms a plurality of divided areas. The game image generating means (36, 42, 88, S13, S25, S55, S67) generates game images in each of the divided areas allotted to each player based on the game program and the operation from the operating means. The evaluating value setting means (36, 84, S17-S19, S59-S61) sets an evaluating value of each player according to a superiority or inferiority situation of the play content of each player. Furthermore, the size changing means (36, 86, S21-S23, S63-S65) changes a size of the divided areas allotted to each player based on the evaluating value. Therefore, during a time that the game is being played, the display screen is generated in correspondence with a change of the divided areas by the game image generating means, and displayed on the display means. Therefore, according to the game apparatus according to the present invention, the size of the divided areas is changed according to the superiority or inferiority situation of the play content of each player, and therefore, it is possible to easily comprehend the superiority or inferiority situation of the play content of each player, and in addition, increase the amusement of the game.

In one embodiment, the screen dividing means equally divides an area of the display area by the number of the participating players, and the size changing means changes the area of the divided areas of each player. More specifically, the screen dividing means corresponds to a step S11. If equally divided by the number of the participating players, it is possible to equally distribute the display area to each player at the start of the game. The size changing means corresponds to steps S21 and S23. Thus, it is possible to easily perform the size change of each divided area by the area.

In a certain aspect of one embodiment, a game apparatus further comprises a display area rendering means for rendering a circular display area within the display screen. In this game apparatus, the screen dividing means equally divides the circular display area rendered by the display area rendering means by the number of the participating players in such a manner that each divided area is rendered an angle that passes the center thereof, and the size changing means changes a center angle of the divided areas of each player. More specifically, the display area rendering means (36, 42, 78, S51) renders the circular display area within the display screen. The screen dividing means corresponds to a step S53. Thus, if the circular display area is set, it becomes easy to divide the display area even if the number of the participating players is an odd number. Furthermore, if divided equally, it is possible to equally distribute the display area to each player at the start of the game. In addition, the size changing means corresponds to steps S63 and S65. Thus, it is possible to easily perform the size change of each divided area by the center angle.

In another embodiment, the game image generating means generates a changed game image according to a size change of the divided areas by the size changing means. The game image generating means generates the game image in such a manner as to change a visual range, for example. More specifically, the game image generating means corresponds to steps S25 and S67. Furthermore, a size of an object rendered in each divided area may be changed (FIG. 19). Therefore, it may be possible to affect progress of the game by applying advantages or disadvantages to the play of the game, for example, and thus, increase the amusement of the game.

In another aspect, a game apparatus further comprises a determining means for determining whether or not there is the player who ends the game out of the participating players. In this game apparatus, the size changing means re-divides the display area by the number of the remaining players that subtract the players when determined by the determining means that there is the player who ends the game, and determines a size of re-divided areas based on the evaluating value of the remaining players. More specifically, the determining means (36, 90, S73) determines whether or not there is a player who ends the game out of the participating players. Furthermore, the size changing means corresponds to steps S75 and S77. Therefore, it is possible to delete the divided areas for the player who ends the game from the display area, and therefore, it is possible to easily comprehend the superiority or inferiority situation of the play content, and furthermore, put the display area to an effective use.

A game system according to the present invention is a game system that a plurality of players participate and play a game, and having a video game machine connected to a common display and a plurality of hand-held game machines including a separate display connected via a connecting means. This game system comprises an exchanging means for exchanging data between the video game machine and the hand-held game machine; and an evaluating value setting means for setting an evaluating value of each player according to a superiority or inferiority situation of a play content of each player. The hand-held game machine includes a first game-program storing means, an operating means, and a first game-image generating means. The first game-program storing means stores a program for a player's own hand-held game. The operating means is operated by the player. The first game-image generating means generates a separate game image to be displayed on the separate display based on the program for a player's own hand-held game or an operation from the operating means. The video game machine includes a second game-program storing means, a number-of-players detecting means, a screen dividing means, a second game-image generating means, and a size changing means. The second game-program storing means stores an operating program for the video game machine and a program for an interlocking game. The number-of-players detecting means detects the number of players who participate in the game. The screen dividing means divides a display area included in a common screen to be displayed on the common display in correspondence with the number of the participating players, and forms a plurality of divided areas. The second game-image generating means generates game images in each of the divided areas allotted to each player based on the program stored in the second game-program storing means or on an operation from the operating means received by the exchanging means. Furthermore, the size changing means changes a size of the divided areas allotted to each player based on the evaluating value set by the evaluating value setting means.

More specifically, the game system (10: FIG. 20) is a system having a video game machine (12) connected to a common display (34), and a plurality of hand-held game machines (108) including a separate display (114) connected via a connecting means (110), and that a plurality of players participate and play the game. The exchanging means (36, 92, 94, 124, 144, 146, S91, S95, S97, S111, S113, S117) exchanges data between the video game machine and the hand-held game machine. In this exchanged data, an operation (key input information) from the operating means (116), an evaluating value, and etc., are included. The evaluating value setting means (36, 84, 124, S17-S19, S59-S61) sets the evaluating value of each player according to a superiority or inferiority situation of a play content of each player. In the hand-held game machine, a first game-program storing means includes a WRAM 126 or a ROM 130, and a program for a player's own hand-held game is stored therein. The operating means (116) is operated by the player, and based on an operation from this operating means (116), the game in the hand-held game machine, and the game in the video game machine are facilitated. The first game-image generating means (124, 142, S107, S115, S119) generates a separate game image to be displayed on the separate display based on the program for a player's own game or the operation from the operating means. In the video game machine, a second game-program storing means includes a main memory (40) or an optical disk (18), and an operating program for this video game machine and a program for an interlocking game are stored therein. The number-of-players detecting means (36, 80, S5, S45) detects the number of players who participate in the game. The screen dividing means (36, 82, S11, S53) divides a display area included in a common screen to be displayed on the common display in correspondence with the number of the participating players, and forms a plurality of divided areas. The second game-image generating means (36, 42, 88, S13, S25, S55, S67, S93) generates game images in each of the divided areas allotted to each player based the program stored in the second game-program storing means or the operation from the operating means received by the exchanging means. The size changing means (36, 86, S21-S23, S63-S65, S93) changes a size of the divided areas allotted to each player based on the evaluating value set by the evaluating value setting means.

Therefore, during a time that the game is played, the common screen corresponding to the change of the divided areas is generated by the second game-image generating means, and displayed on the common display. According to this game system, similar to the above-described game apparatus, it is possible to easily comprehend the superiority or inferiority situation of the play content of each player, and increase the amusement of the game.

In one embodiment, the evaluating value setting means is provided in the video game machine, and the first game-image generating means re-generates the separate game images based on the evaluating value of the player received from the video game machine by the exchanging means. More specifically, the evaluating value setting means is provided in the video game machine. In addition, the first game-image generating means corresponds to a step S119. Therefore, the separate game images to be displayed on the separate display of the hand-held game machine is also changed according to the superiority or inferiority situation of the play content on the common screen, and therefore, it is possible to realize an interlocking game with increased amusement.

A game apparatus according to the present invention is a game apparatus that is provided to be associated with a display means, and a plurality of players participate and play a game on a display screen displayed on the display means. This game apparatus comprises a game program storing means, an operating means, a number-of-players detecting means, a screen dividing means, a game image generating means, a determining means, and a re-dividing means. The game program storing means stores a game program. The operating means is operated by the player. The number-of-players detecting means detects the number of players who participate in the game. The screen dividing means divides a display area included in the display screen by the number of the participating players, and forms a plurality of divided areas. The game image generating means generates game images in each of the divided areas allotted to each player based on the game program and an operation from the operating means. The determining means determine whether or not there is the player who ends the game out of the participating players. Furthermore, the re-dividing means re-divides the display area by the number of the remaining players that subtract the number of players when determined by the determining means that there is the player who ends the game, and allots the re-divided areas to the remaining players.

More specifically, the game apparatus (12) comprises a game program storing means, an operating means, a number-of-players detecting means, a screen dividing means, a game image generating means, and a determining means. Each of these means is almost similar to the corresponding means in the above-described game apparatus, and therefore, descriptions will be herein omitted. Furthermore, the re-dividing means (36, 86, S75, S77) re-divides the display area by the number of the remaining players that subtract the number of players when determined by the determining means that there is the player who ends the game, and allots the re-divided areas to the remaining players. Therefore, it is possible to delete from the display area the divided areas for the player who ends the game so that it is possible to easily comprehend the superiority or inferiority situation of the play content, and put the display area to an effective use.

A game system according to the preferred embodiment of the present invention is a game system that a plurality of players participate and play a game, and having a video game machine connected to a common display and a plurality of hand-held game machines including separate displays means connected via a connecting means. This game system comprises an exchanging means for exchanging data between the video game machine and the hand-held game machine. The hand-held game machine includes a first game-program storing means, an operating means, and a first game-image generating means. The first game-program storing means stores a program for a player's own hand-held game. The operating means is operated by the player. The first game-image generating means generates a separate game image to be displayed on the separate display based on the program for a player's own hand-held game or an operation from the operating means. The video game machine includes a second game-program storing means, a number-of-players detecting means, a screen dividing means, a second game-image generating means, a determining means, and a re-dividing means. The second game-program storing means stores an operating program for the video game machine and a program for an interlocking game. The number-of-players detecting means detects the number of players who participate in the game. The screen dividing means divides the display area included in a common screen to be displayed on the common display in correspondence with the number of the participating players, and forms a plurality of divided areas. The second game-image generating means generates game images in each of the divided areas allotted to each player based on the program stored in the second game-program storing means or an operation from the operating means received by the exchanging means. The determining means determines whether or not there is the player who ends the game out of the participating players. The re-dividing means re-divides the display area by the number of the remaining players that subtract the player when determined by the determining means that there is the player who ends the game, and allots the re-divided areas to the remaining players.

More specifically, the game system (10) is a game system having a video game machine and a plurality of hand-held game machines connected, and comprises an exchanging means. In addition, the hand-held game machine includes a first game-program storing means, an operating means, and a first game-image generating means, and the video game machine includes a second game-program storing means, a number-of-players detecting means, a screen dividing means, a second game-image generating means. These means are almost similar to the corresponding means in the above-described game system, and therefore, descriptions will be herein omitted. Furthermore, in the video game machine, the determining means (36, 90, S73) determines whether or not there is the player who ends the game out of the participating players. The re-dividing means (36, 86, S75, S77) re-divides the display area by the number of the remaining players that subtract the player when determined by the determining means that there is the player who ends the game, and allots the re-divided areas to the remaining players. Therefore, it is possible to delete from the display area the divided areas for the player who ends the game so that it is possible to easily comprehend the superiority or inferiority situation of the play content, and put the display area of the common screen to an effective use.

A game program storing medium according to the present invention is a storing medium that stores a game program for changing a plurality of divided areas on a display screen in a game apparatus that is provided to be associated with the display means, and a plurality of players participate in a game and operate an operating means so as to play the game on the display screen displayed on the display means. The game program of this storing medium includes a number-of-players detecting step, a screen dividing step, a game-image generating step, an evaluating value setting step, and a size changing step, and allows a computer of the above game apparatus to execute these steps. The number-of-players detecting step detects the number of players who participate in the game. The screen dividing step divides the display area included in the display screen by the number of the participating players, and forms the plurality of divided areas. The game-image generating step generates game images in each of the divided areas allotted to each player based on an operation from the operating means. The evaluating value setting step sets an evaluating value of each player according to a superiority or inferiority situation of a play content of each player. Furthermore, the size changing step changes a size of the divided areas allotted to each player based on the evaluating value.

A game program storing medium according to the present invention is a storing medium that stores a game program for changing a plurality of divided areas on a common screen in a game system having a video game machine connected to a common display, and a plurality of hand-held game machines including an operating means operated by a player and a separate display connected via a connecting means, and that a plurality of players participate and play the game on the common screen displayed on the common display and a separate screen displayed on the separate display. The game program of this storing medium allows a computer of the hand-held game machine to execute an operation transferring step, and a first game-image generating step. The operation transferring step transfers an operation from the operating means to the video game machine. The first game-image generating step generates a separate game image to be displayed on the separate display based on the operation from the operating means. In addition, the game program of this storing medium allows a computer of the video game machine to execute an operation receiving step, a number-of-players detecting step, a screen dividing step, a second game-image generating, an evaluating value setting step, and a size changing step. The operation receiving step receives an operation from the hand-held game machine. The number-of-players detecting step detects the number of the players who participate in the game. The screen dividing step divides a display area included in the common screen in correspondence with the number of the participating players, and forms the plurality of divided areas. The second game-image generating step generates game images in each of the divided areas allotted to each player based on an operation received by the operation receiving step. The evaluating value setting step sets an evaluating value of each player according to a superiority or inferiority situation of a play content of each player. The size changing step changes a size of the divided areas allotted to each player based on the evaluating value.

According to these game program storing media, similar to the above-described game apparatus and the game system, it is possible to easily comprehend the superiority or inferiority situation of the play content of each player, and increase the amusement of the game.

A game program storing medium according to, a preferred embodiment of the present invention is a storing medium that stores a game program for changing a plurality of divided areas on a display screen in a game apparatus that is provided to be associated with a display means, and a plurality of players participate in a game and operate an operating means so as to play the game on the display screen displayed on the display means. The game program of this storing medium comprises a number-of-players detecting step, a screen dividing step, a game-image generating step, a determining step, and a re-dividing step, and allows a computer of the above-described game apparatus to execute these steps. The number-of-players detecting step detects the number of players who participate in the game. The screen dividing step divides a display area included in the display screen by the number of the participating players, and forms the plurality of divided areas. The game-image generating step generates game images in each of the divided areas allotted to each player based on an operation from the operating means. The determining step determines whether or not there is the player who ends the game out of the participating players. The re-dividing step re-divides the display area by the number of the remaining players that subtract the number of the players when determined by the determining step that there is the player who ends the game, and allots the re-divided areas to the remaining players.

A game program storing medium according to the present invention is a storing medium that stores a game program for changing a plurality of divided areas on a common screen in a game system having a video game machine connected to a common display, and a plurality of hand-held game machines including an operating means operated by a player and a separate display connected via a connecting means, and that a plurality of players participate and play the game on the common screen displayed on the common display and a separate screen displayed on the separate display. The game program of this storing medium allows a computer of the hand-held game machine to execute an operation transferring step, and a first game-image generating step. The operation transferring step transfers an operation from the operating means to the video game machine. The first game-image generating step generates a separate game image to be displayed on the separate display based on the operation from the operating means. Furthermore, the game program of this storing medium allows a computer of the video game machine to execute an operation receiving step, a number-of-players detecting step, a screen dividing step, a second game-image generating step, a determining step, and a re-dividing step. The operation receiving step receives an operation from the hand-held game machine. The number-of-players detecting step detects the number of players who participate in the game. The screen dividing step divides a display area included in the common screen in correspondence with the number of the participating players, and forms the plurality of divided areas. The second game-image generating step generates game images in each of the divided areas allotted to each player based on an operation received by the operation receiving step. The determining step determines whether or not there is the player who ends the game out of the participating players. The re-dividing step re-divides the display area by the number of the remaining players that subtract the number of players when determined by the determining step that there is the player who ends the game, and allots the re-divided areas to the remaining players. According to these game program storing media, similar to the above-described game apparatus and the game system, it is possible to easily comprehend the superiority or inferiority situation of the play content of each player, and put the display area of the common screen to an effective use.

According to the present invention, each of the divided areas is changed according to the superiority or inferiority of the play content of each player so that it is possible to easily comprehend the superiority or inferiority situation of the play content of each player, and increase the amusement of the game.

The above-described objects and other objects, features, aspects and advantages of the present invention will become more apparent from the following detailed description of the present invention when taken in conjunction with the accompanying drawings.

BRIEF DESCRIPTION OF THE DRAWINGS

FIG. 14 is an illustrative view showing one example of a display screen that a player 2 defeats an enemy character from the FIG. 13 situation in the game apparatus of the FIG. 1 embodiment;

FIG. 15 is an illustrative view showing one example of a display screen of a situation that the player 2 facilitates the game advantageously from the FIG. 13 situation in the game apparatus of the FIG. 1 embodiment;

DETAILED DESCRIPTION OF THE PREFERRED EMBODIMENTS

Figure 1:
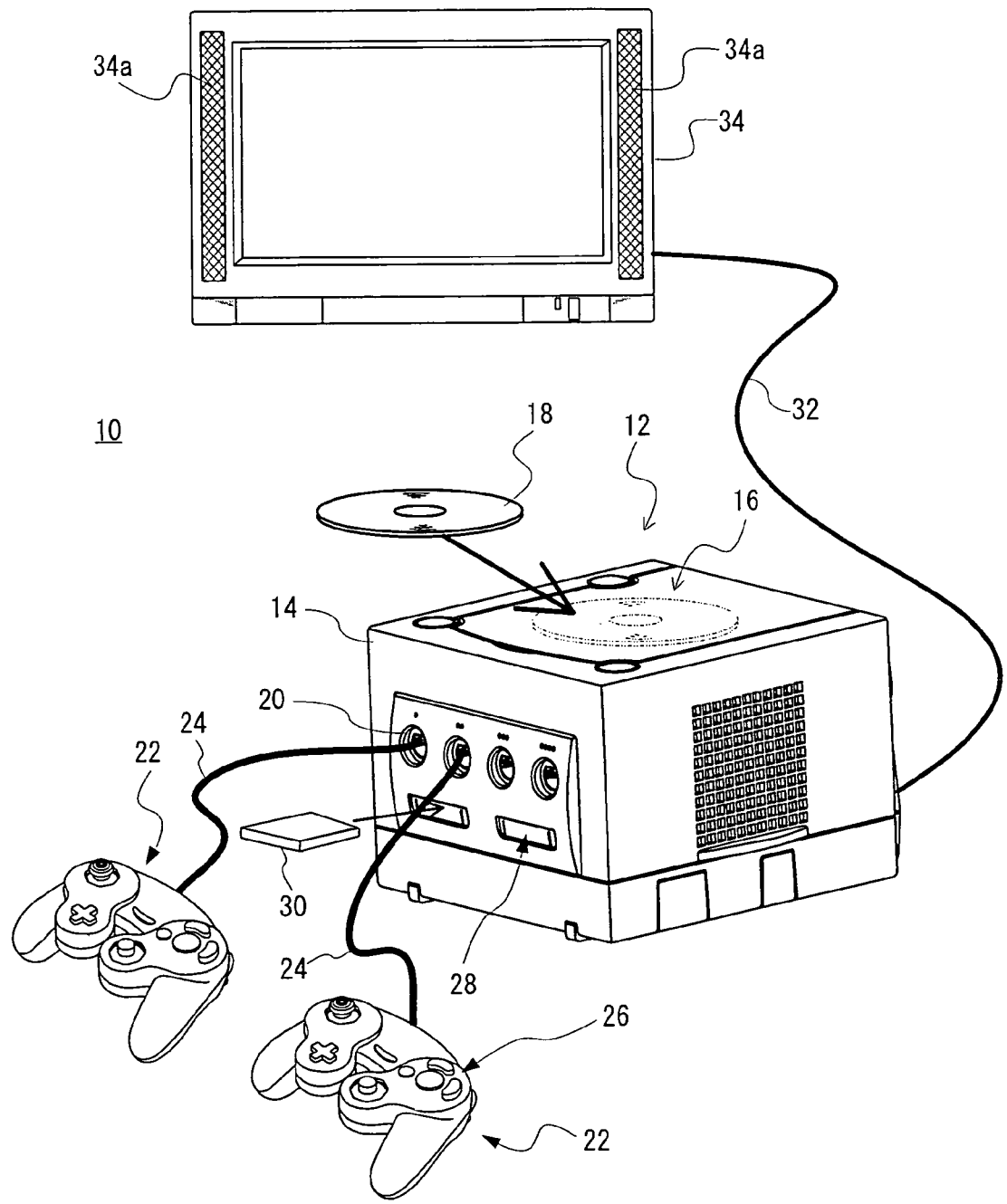
FIG. 1 is an illustrative view showing an outline of a game apparatus of one embodiment of the present invention.

A video game system 10 of this embodiment shown in FIG. 1 includes a video game apparatus or a video game machine (hereinafter briefly referred to as a "game machine") 12. A power is supplied to this game machine 12, and this power may be an ordinary AC adaptor (not shown) in the embodiment. The AC adaptor is inserted into a home-use conventional wall outlet, and converts a home-use power into a low DC voltage signal appropriate for driving the game machine 12. In another embodiment, a battery may be used as the power.

The game machine 12 includes an approximately cubic housing 14, and at an upper end of the housing 14, an optical disk drive 16 is provided. In the optical disk drive 16, an optical disk 18, which is one example of an information storing medium that stores a game program, is attached. At a front surface of the housing 14, a plurality of (4 in this embodiment) connectors 20 are provided. These connectors 20 are connectors for connecting a controller 22 to the game machine 12 by a cable 24, and in this embodiment, it is possible to connect a maximum of four controllers to the game machine 12.

It is noted that only two controllers 22 are shown in FIG. 1 as an example, and however, the controllers 22 equal to the number of players who participate in the game are connected.

In the controller 22, an operating means (control) 26 is provided at its upper, lower, side surfaces, and etc. The operating means 26 includes two analog joysticks, one cross key, a plurality of button switches, and etc., for example. One analog joystick is used for inputting a moving direction and/or a moving speed or a moving amount of the player character (moving image character operable by the player using the controller 22) by a slanting amount and a direction of the stick. Another analog joystick controls by a slanting direction a movement of a virtual camera, for example. The cross switch is used for instructing the moving direction of the player character in place of the analog joystick. The button switch is used for instructing the movement of the player character, changing a viewpoint of the virtual camera of a three-dimensional image, adjusting the moving speed of the player character, and so forth. Furthermore, the button switch controls a menu selection, and a pointer or a cursor movement.

It is noted that in this embodiment, the controller 22 is connected to the game machine 12 by the cable 24. However, the controller 22 may be connected to the game machine 12 by another method such as in a wireless manner via an electromagnetic wave (radio wave or infrared ray, for example). In addition, specific structure of the operating means of the controller 22 is not limited to the structure of the embodiment, and a variety of changes are possible. One analog joystick may be sufficient, or may not be used at all, for example. In another embodiment, the cross switch may not be used.

Below the connector 20 at the front surface of the housing 14 of the game machine 12, at least one (2 in this embodiment) memory slot 28 is provided. A memory card 30 is inserted into this memory slot 28. The memory card 30 is used for loading and temporarily storing a game program, display-use data, and etc., read out from the optical disk 18 (see FIG. 3), saving game data (result of the game, for example) of the game played using this game system 10, and so forth.

At a rear surface of the housing 14 of the game machine 12, an AV cable connector (not shown) is provided, and using the connector, a monitor 34 is connected to the game machine 12 through an AV cable 32. Typically, the monitor 34 is a color television receiver, and the AV cable 32 inputs a video signal from the game machine 12 to a video input terminal of the color television, and applies a sound signal to an audio input terminal. Therefore, a game image of a three-dimensional (3D) video game may be displayed on the color television (monitor) 34, and a stereo game sound such as a game music (BGM), a sound effect, and etc., may be output from speakers 34a on both sides.

In this game system 10, in order for a user or a game player to play the game (or another application), the user, first, turns on the power of the game machine 12, next, the user selects the appropriate optical disk 18 that stores a video game (or another application intended to play), and loads the optical disk 18 into the disk drive 16 of the game machine 12. Accordingly, the user allows the game machine 12 to start executing the video game or another application based on a software stored in the optical disk 18. The user operates the controller 22 in order to apply an input to the game machine 12. The user starts the game or another application by operating one of features of the operating means 26. It is possible to move the moving image character (player character) to a different direction or change a viewpoint (camera location) of the user in a three-dimensional (3D) game world.

Figure 2:
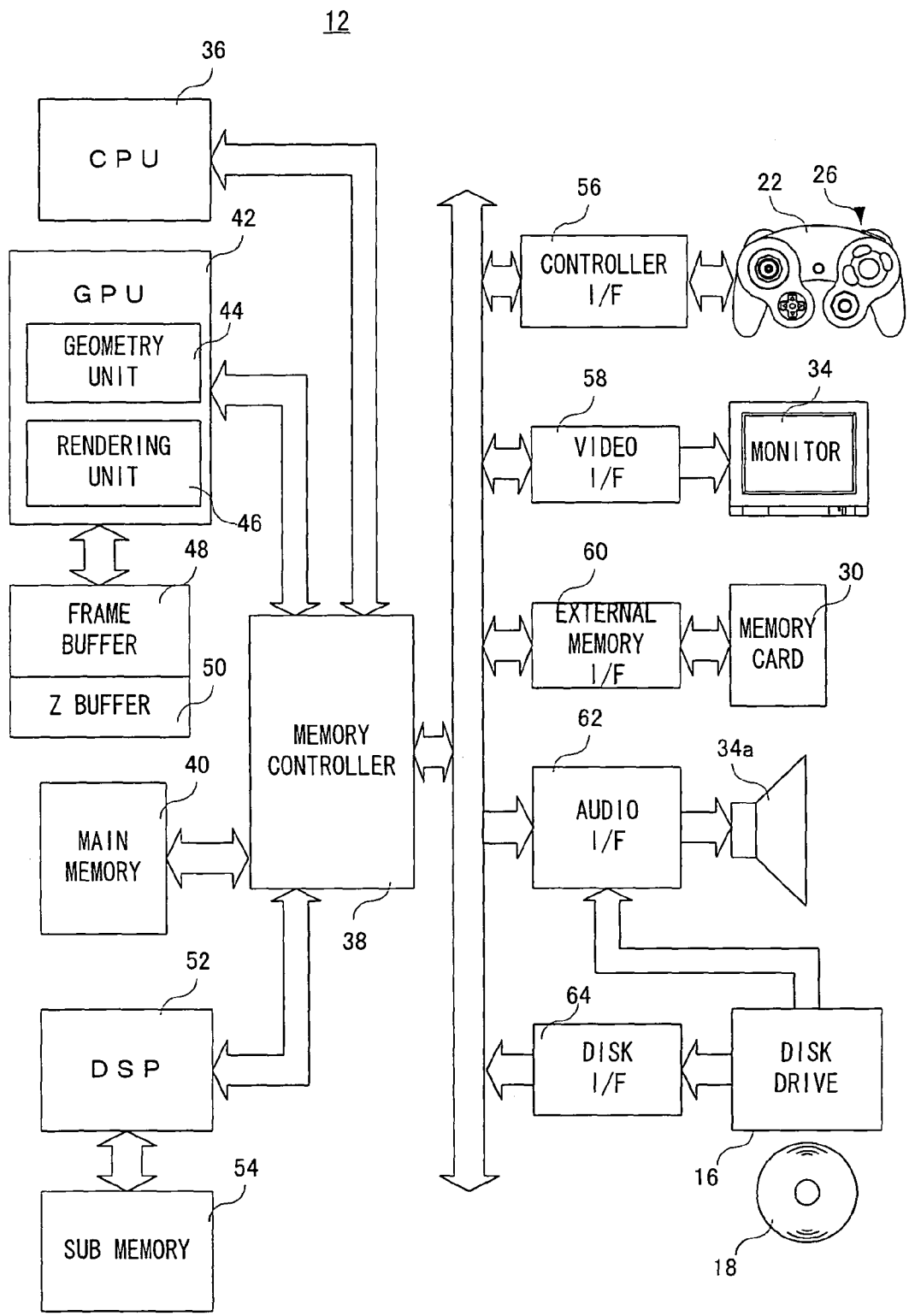
FIG. 2 is a block diagram showing one example of internal structure of the game apparatus of the FIG. 1 embodiment.

FIG. 2 is a block diagram showing electric internal structure of the video game system 10 of the FIG. 1 embodiment. In the video game machine 12, a central processing unit (hereinafter briefly referred to as "CPU") 36 is provided. The CPU 36 is also called as a computer or a processor, and etc., and responsible for entirely controlling the game machine. The CPU 36 or computer functions as a game processor, and is joined to the memory controller 38 via a bus. Primarily, the memory controller 38 controls a writing or a reading of the main memory 40, joined via the bus under the control of the CPU 36. The main memory 40 is used as a working area or a buffer area. To the memory controller 38, a GPU (Graphics Processing Unit) 42 is joined.

The GPU 42 is constructed of a single chip ASIC, for example, and receives a graphics command (rendering instruction) from the CPU 36 via the memory controller 38 so as to generate a three-dimensional (3D) game image by a geometric unit 44 and a rendering unit 46 according to that command. That is, the geometric unit 44 performs coordinate operation processes such as a rotation, a movement, a deformation, and etc., of various characters and objects in a three-dimensional coordinate system (constructed of a plurality of polygons. In addition, the polygon is a polygonal plain surface defined by at least three vertexes coordinates). The rendering unit 46 performs rendering processes such as attaching (rendering) a texture (texture image) to each polygon of the various objects, and so forth. Therefore, the 3D image data to be displayed on the game screen is created by the GPU 42, and the image data (texture data) is rendered (stored) within a frame buffer 48.

It is noted that the data (primitive or polygon or texture, and etc.) necessary for the GPU 42 to execute the graphics command is obtained by the GPU 42 from the main memory 40 via the memory controller 38.

The frame buffer 48 is a memory for rendering (accumulating) the image data worth 1 frame of a luster scanning monitor 34, for example, and overwritten by the GPU 42 by each 1 frame. As a result of a video I/F 58 described later reading out the data of the frame buffer 48 via the memory controller 38, the game image is displayed on the screen of the monitor 34. It is noted that a capacity of the frame buffer 48 has a site corresponding to the number of pixels (pixel or dot) of the screen intended to be displayed. It has the number of pixels corresponding to the number of pixels (storing location or address) of the display or the monitor 34, for example.

In addition, a Z buffer 50 has a storing capacity equal to the number of bits of depth data per the number of pixels (storing location or address) corresponding to the frame buffer 48×one pixel, and stores depth information or the depth data (Z value) of dots corresponding to each storing location of the frame buffer 48.

It is noted that both of the frame buffer 48 and the Z buffer 50 may be constructed using one portion of the main memory 40.

The memory controller 38 is also joined to a sub memory 54 via a DSP (Digital Signal Processor) 52. Therefore, the memory controller 38 controls the writing and/or reading-out of not only the main memory 40 but also the sub memory 54 under the control of the CPU 36.

The DSP 52 functions as a sound processor, and executes an audio processing task. The sub memory 54 is used as an audio memory for storing sound waveform data, and etc., read out from the disk 18, for example. The DSP 52 receives an audio processing command from the CPU 36 via the memory controller 38, extracts the necessary sound waveform data in correspondence with the command, and performs processes/mixings of a pitch modulation, a mixing between sound data and effect data, and etc., for example. The audio processing command is issued by reading out one after another and analyzing performance control data written in the main memory 40 as a result of the sound control program being executed, for example. The sound waveform data is read out one after another, and processed by the DSP 52 for generating a game audio content. The generated resultant content or audio output data is buffered into the main memory 40, for example, and next, transferred to an audio I/F 62 so as to be output as a stereo sound, for example, by the speaker 34a. Therefore, the sound is output from the speaker 34.

It is noted that it is needless to say that the generated audio data is not limited to a use for a 2ch stereo reproduction, and capable of corresponding to a surround reproduction of 5.1ch, 6.1ch, 7.1ch, and etc., or a monophonic reproduction, and etc., for example.

Furthermore, the memory controller 38 is joined to each interface (I/F) 56, 58, 60, 62, and 64 by the bus.

The controller I/F 56 is an interface for the controller 22, and applies to the CPU 36 an operating signal of the operating means of the controller 22 or data through the memory controller 38.

The video I/F 58 access the frame buffer 48, reads out the image data generated by the GPU 42, and applies to the monitor 34 the image signal or the image data (digital RGB pixel value) via the AV cable 32 (FIG. 1).

The external I/F 60 joins the memory card 30 (FIG. 1) inserted in the front surface of the game machine 12 to the memory controller 38. Thereby, it enables the CPU 36 to write the data into this memory card 30 via the memory controller 38, or read out the data from the memory card 30.

The audio I/F 62 receives the audio data applied from the buffer through the memory controller 38 or a audio stream read out from the optical disk 18, and applies to the speaker 34a of the monitor 34 the audio signal (sound signal) corresponding thereto.

It is noted that in a case of the stereo sound, at least one speaker 34a is provided on each of both sides. In addition, in a case of the surround reproduction, besides the speaker 34a of the monitor 34, additional five speakers and one low sound-use speaker (in a case of a 7.1ch surround reproduction) may be provided via an AV amplifier, and etc. Furthermore, the disk I/F 64 joins the disk drive 16 to the memory controller 38, and therefore, the CPU 36 controls the disk drive 16. Program data, the object data, the image data, the performance data, and etc., read out from the optical disk 18 by this disk drive 16 are written into the main memory 40 under the control of the CPU 36.

Figure 3:
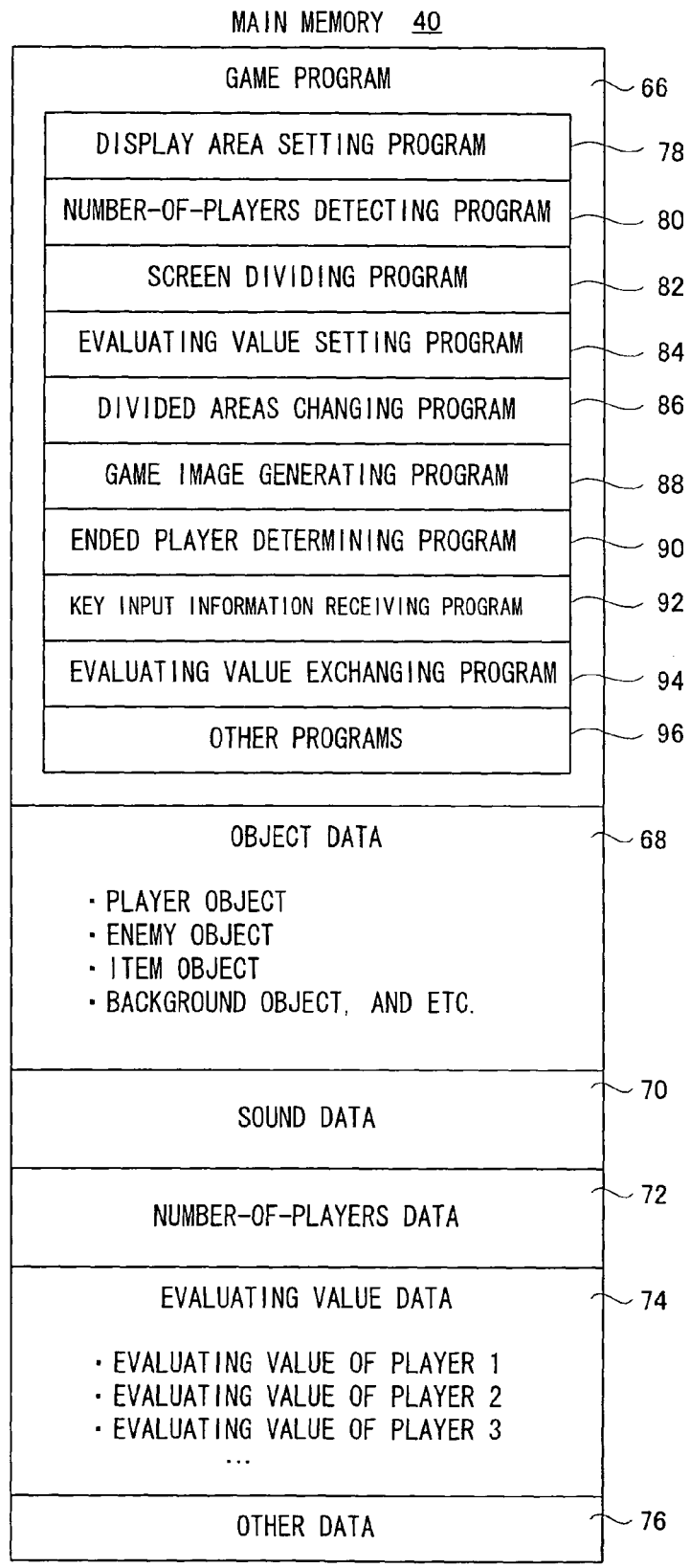
FIG. 3 is an illustrative view showing one example of a memory map of a main memory of FIG. 2.

FIG. 3 shows a memory map of the main memory 40. The main memory 40 includes a game program storing area 66, an object data storing area 68, a sound data storing area 70, the number-of-players data storing area 72, and an evaluating-value-data storing area 74. In addition, a storing area 76 for other various data necessary for facilitating the game is provided.

In the game program storing area 66, the game program read out from the optical disk 18 is stored entirely at once or partially and sequentially. The CPU 36 executes the game process according to the game program. This game program is constructed of a display area setting program 78, a number of players detecting program 80, a screen dividing program 82, an evaluating value setting program 84, a divided areas changing program 86, a game image generating program 88, an ended player determining program 90, a key input information receiving program 92, an evaluating value exchanging program 94, other various programs 96 necessary for proceeding the game, and etc.

Figure 13:
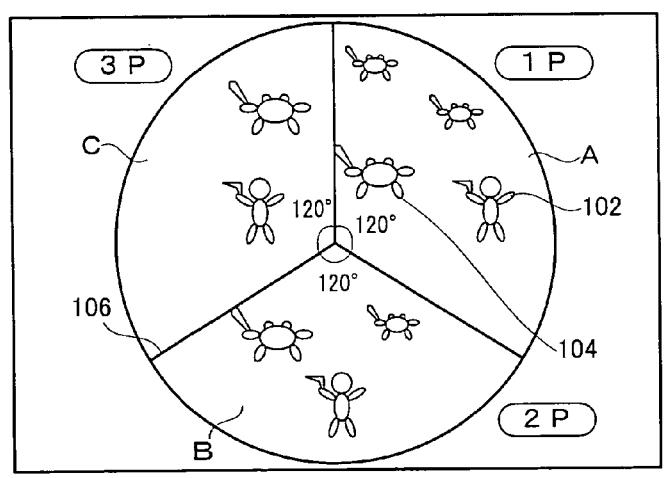
FIG. 13 is an illustrative view showing one example of a display screen at a time of starting the game in a case of a 3-person play in the game apparatus of the FIG. 1 embodiment.

Here, it is noted that the display area setting program 78 is a program for setting a form and a size of the display area within the display screen, and thereby, the display area set to an entire display screen as in FIG. 4 described later, and a circular display area as in FIG. 13 are set. Furthermore, the divided areas changing program 86 includes a size changing program for changing the size of the divided areas, a re-dividing program for re-dividing the display areas, and etc. In addition, the key input information receiving program 92 and the evaluating value exchanging program 94 are programs for an interlocking game in the game system 10 as in FIG. 20 described later, and in addition, illustrated in this FIG. 3.

Into the object data storing area 68, data regarding the game character such as a player object, an enemy object, and etc., an item object such as an item, and etc., and a background object, and etc., are read out from the optical disk 18 and loaded, for example. Each object data includes a polygon regarding the respective objects, and etc. It is noted that data such as the above-described objects, and etc., may be loaded into the main memory 40 from the optical disk 18 as required.

In the sound data storing area 70, performance control information for performing a game music such as a BGM, and etc., are loaded from the optical disk 18, for example.

In the number-of-players data storing area 72, information regarding the players who participate in the game is stored. That is, the number of the participating players is written at a time of starting the game. In addition, if there is player who is game-over, data showing the number of the remaining players that subtract the number of the players who is game-over, which player the remaining players are, and etc., are written.

In the evaluating-value-data storing area 74, information regarding an evaluating value of each player 1, 2, 3, . . . in correspondence with progress of the game. The evaluating value is set according to a superiority or inferiority situation of a play content of the player.

In this game system 10, for example, a multi-player participating-type battle game, in which a plurality of players participate and compete for the superiority, is played. The plurality of players play the game on a display screen, that is, a game screen, displayed on the monitor 34 provided to be associated with the game machine 12.

At a time of starting the game, the number of players who participate is detected. The number of the participating players may be set as a result of the player 1 selecting the number of participants on the menu screen displayed before the game begins, and etc., for example, or each player selecting to participate in the game, and so forth.

Furthermore, the display area included in the display screen is divided by the number of the participating players, the divided display areas (divided areas) are allotted to each player, and the game images for each player is displayed in each divided area.

Herein, the display area is an area for displaying a game space or world in which each player actually plays the game. Depending on the game or the number of participants, and etc., the entire display screen may be set as the display area, and in this case, states of scores, equipment, a physical strength value or a rank, and etc., of each player may be displayed within each player's area. Furthermore, the display area and other areas (area showing the above-described state, and etc.) may be separately provided within the display screen.

At a time of dividing the screen when this game begins, basically, the display areas are equally divided by the number of the participating players, and equally distributed so as not to cause discrepancy among each player. However, as a result of a handicap being set among the players, the divided areas may be divided with a difference in size from the beginning.

Figure 4:
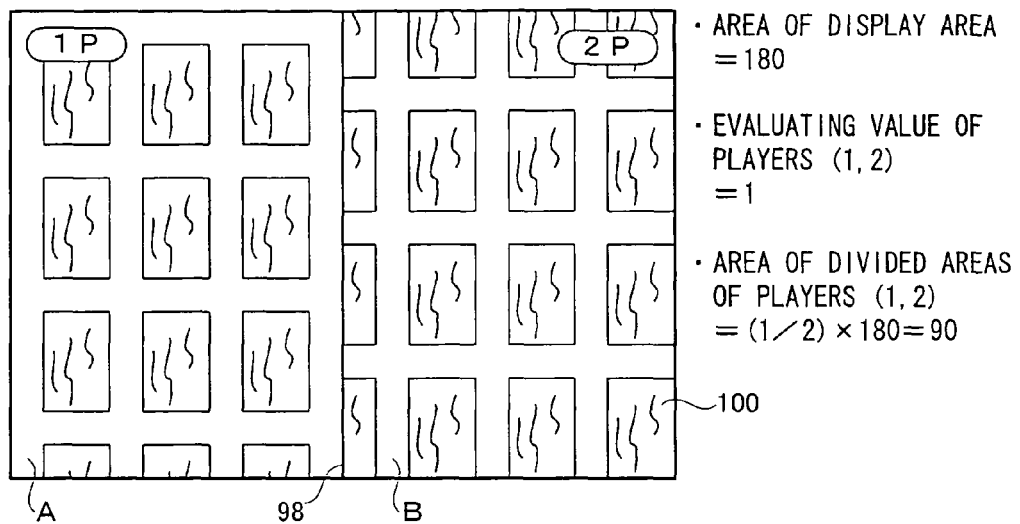
FIG. 4 is an illustrative view showing one example of a display screen at a time of starting a game in a case of a 2-person play in the game apparatus of the FIG. 1 embodiment.

FIG. 4 shows one example of the display screen at a time of starting the game in a case of a 2-person play. In this example, the entire display screen is set as the display area, and therefore, the display area is a rectangular shape. Furthermore, as for a kind of the games, a game such as a Japanese card game of the one hundred famous poems or a Japanese playing card, and etc., is displayed as an example. That is, each player listens to a sound output from the speaker 34a, and operates the operating means 26 of the respective controllers 22 so as to find and take the card (object) 100 faster than another player, thus competing for the number of cards obtained at the end.

In FIG. 4, a divided area A for the player 1 and a divided area B for the player 2 are formed as a result of the display screen being equally divided. More specifically, each divided area is in a rectangular shape, and divided into right and left portions by a partition object 98 that extends in the vertical direction, for example. The display screen in this example, that is, the entire area of the display area is 180, and therefore, each divided area has the area of 90.

It is noted that a dividing manner is changed as required, and in another embodiment, the divided area may be divided into upper and lower portions by the partition object that extends in the horizontal direction, for example.

In addition, in this game system 10, the evaluating value is set to each player, and the evaluating value is changed according to the superiority or inferiority situation of the play content of each player while the game is facilitated. Furthermore, a size of the divided areas is changed based on the evaluating value.

In an example of FIG. 4, for example, each player has the evaluating value set to "1" at a time of starting the game. Furthermore, when one of the players takes the card 100, 0.5 is added to the evaluating value of the player, for example.

In addition, based on the evaluating value of each player, the area of the divided areas of each player is calculated. More specifically, the area of the divided areas of each player may be calculated by ((the evaluating value of the player/sum of the evaluating values of all players)×area of the display area)). In this case, all areas of the display area are proportionally distributed according to the evaluating value of each player.

Figure 5:
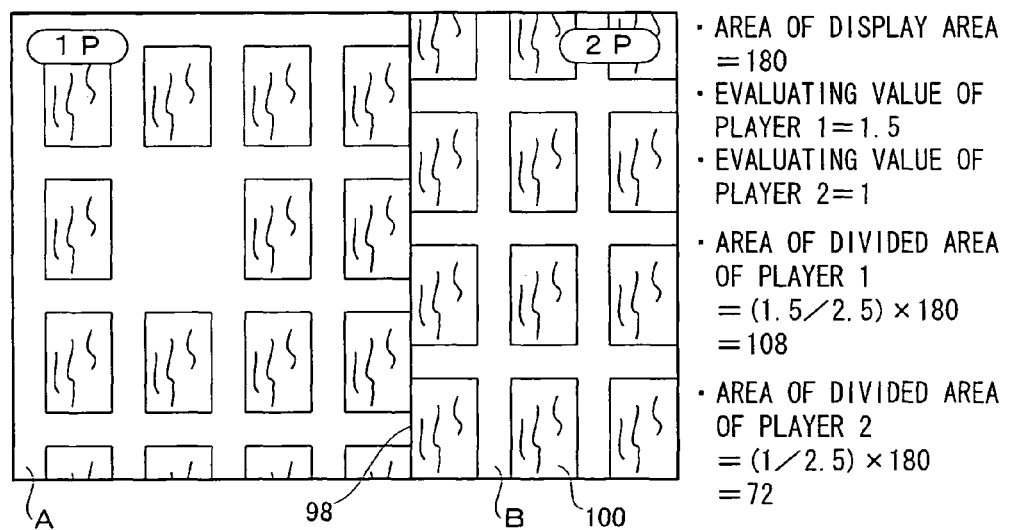
FIG. 5 is an illustrative view showing one example of a display screen when a player 1 takes a card from a FIG. 4 situation in the game apparatus of the FIG. 1 embodiment.

As FIG. 5 shows, in a case that the player 1 takes one card 100, the evaluating value of the player 1 becomes 1.5, and therefore, the area of the divided area A of the player 1 becomes 108, and the area of the divided area B of the player 2 becomes 72. Based on the area of each divided area thus calculated, each divided area is changed, and a position of the partition object 98 is changed. It is noted that it is needless to say that it may be possible to calculate the position of the partition object 98 or a length in the horizontal direction (in a case of dividing into right and left) of each divided area from an area ratio between the divided areas or a ratio between the evaluating values. In a case that when the length in the horizontal direction of the display area in FIG. 5 is 18, the length in the horizontal direction of the divided area A is (108/180)×18=10.8, and the length in the horizontal direction of the divided area B is (72/180)×18=7.2.

Furthermore, in correspondence with the change of the size of the divided areas, the game image of each divided area having the size appropriate for the changed size is re-generated, and the changed game image is generated. At this time, an aspect of the game image displayed in each divided area is also changed, for example. In this embodiment, as understood from FIG. 5, in correspondence with the change of the divided areas, the visual range of the game image displayed in each divided area is changed. As a result of the change of this visual range, the player 1 becomes capable of seeing the card 100 which has not been seen until this time, on the contrary, the player 2 becomes incapable of seeing the card 100 which has been seen until this time. It is noted that each player can find the card 100 by scrolling the screen within each divided area by operating the operating means 26.

Figure 6:
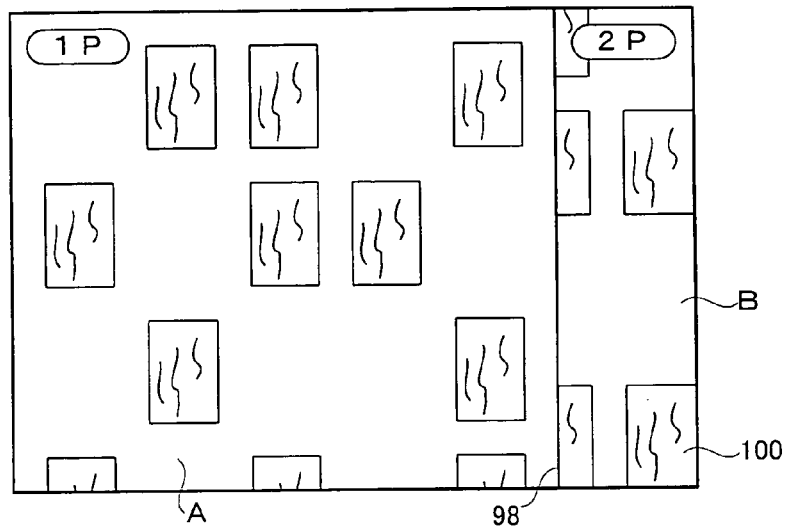
FIG. 6 is an illustrative view showing one example of a display screen of a situation that the player 1 facilitates the game advantageously from the FIG. 4 situation in the game apparatus of the FIG. 1 embodiment.

In FIG. 6, the display screen, which is a situation that the player 1 facilitates the game further advantageously later, is displayed. That is, the player 1 takes many cards 100, and facilitates the game advantageously. The divided area A has become to have a very large size compared to the divided area B of the player 2. If such the situation has been established, many cards 100 are displayed at one time in the divided area A of the player 1, and only a small number of cards are displayed in the divided area B of the player 2. Therefore, a large difference between players occurs regarding the number of the cards 100 to be displayed so that the advantageous player 1 can play the game increasingly advantageously, and the player 2 becomes increasingly disadvantageous.

Figure 7:
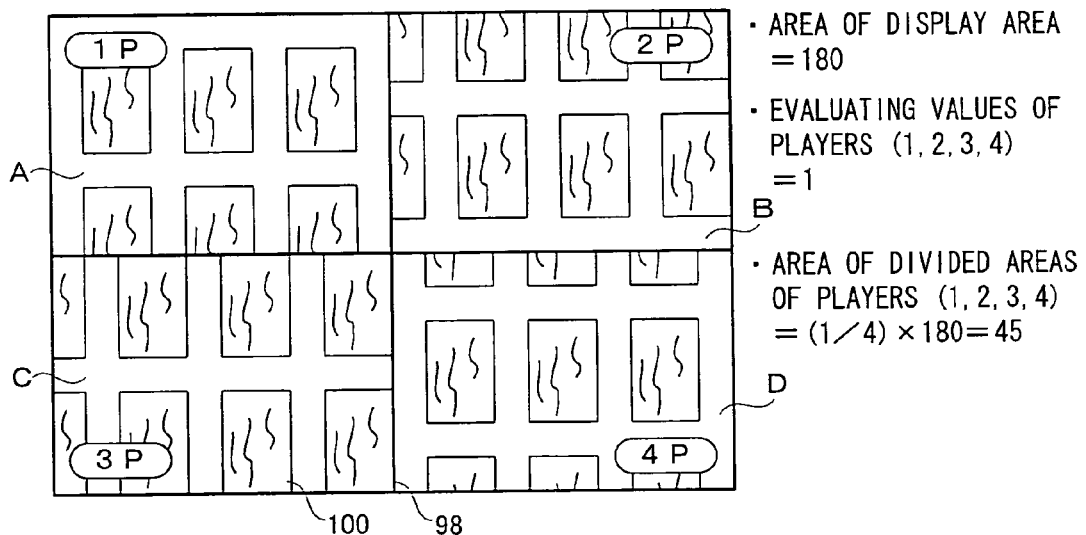
FIG. 7 is an illustrative view showing one example of a display screen at a time of starting the game in a case of a 4-person play in the game apparatus of the FIG. 1 embodiment.
Figure 8:
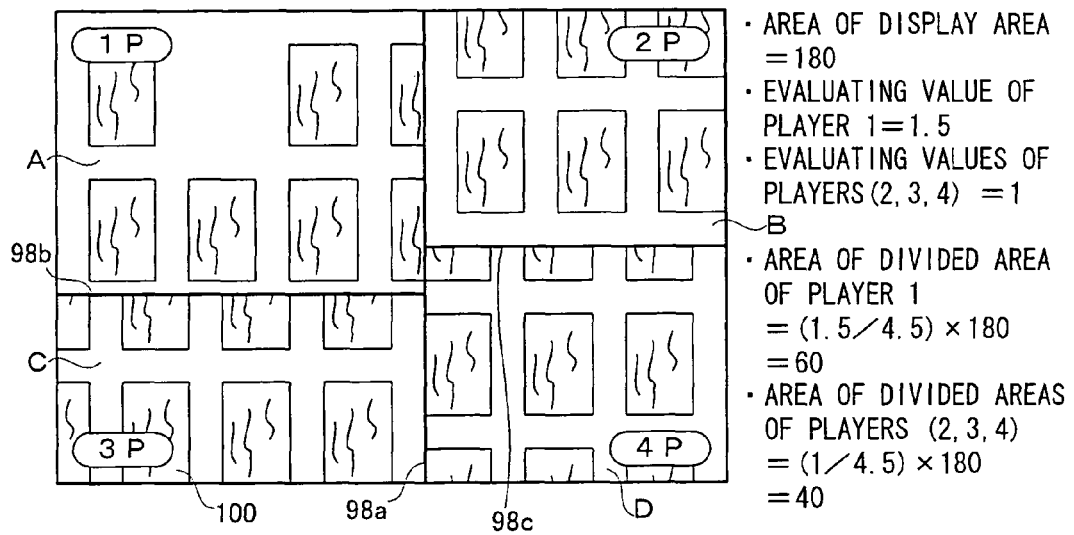
FIG. 8 is an illustrative view showing one example of a display screen that the player 1 takes a card from the FIG. 7 situation in the game apparatus of the FIG. 1 embodiment.
Figure 9:
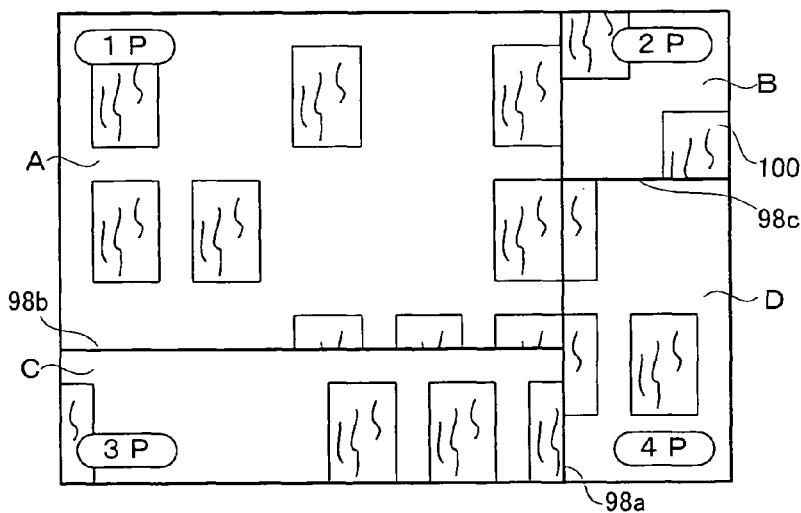
FIG. 9 is an illustrative view showing one example of a display screen that the player 1 facilitates the game advantageously from the FIG. 7 situation in the game apparatus of the FIG. 1 embodiment.

An example of progress of the display screen in a case of a 4-person play is displayed in FIG. 7 to FIG. 9. In the case of the 4-person play, too, the divided areas are changed approximately similar to the case of the above-described 2-person play.

In FIG. 7, the display screen at a time of starting the game is displayed, and the rectangular-shaped divided areas A, B, C and D of each player 1, 2, 3 and 4 are equally divided by the partition object 98. It is noted that each divided area has an area of 45.

In FIG. 8, the display screen in a case that the player 1 takes one card 100 from the FIG. 7 situation is displayed. In this case, the evaluating value of the player 1 is added by 0.5 and rendered 1.5, and therefore, the area of the divided area A of the player 1 becomes 60, the areas of the divided areas B, C and D of another player 2, 3 and 4 become 40. Based on these calculated areas of each of the divided areas, each divided area is changed. Furthermore, in correspondence with the change of each divided area, the visual range of the game image of each divided area is changed.

Regarding the change of the divided areas of this FIG. 8 example, the right/left division of the display screen is rendered the basis. That is, first, a dividing location of the both sides (right and left) is determined, and later, the upper and lower dividing locations in each area of the both sides are determined. In this example, a group of the player 1 and the player 3 is arranged on the left side, and a group of the player 2 and player 4 on the right side. Therefore, from a ratio between a sum of the areas of the divided area A of the player 1 and the divided area C of the player 3 (or a sum of the evaluating value of the player 1 and the evaluating value of player 3) and, a sum of the areas of the divided area B of the player 2 and the divided area D of the player 4 (or a sum of the evaluating value of the player 2 and the evaluating value of the player 4), a location of the basic partition object 98a that divides into the both sides across upper and lower sides of the display screen, or a length in the horizontal direction of each divided area is calculated. Furthermore, the location of a partition object 98b that extends in the horizontal direction and divides the divided area A and the divided area C, or the length in the vertical direction of the divided area A and the divided area C is calculated from an area ratio between the divided area A and the divided area C (or a ratio between the evaluating values of the player 1 and the player 3). In addition, the location of a partition object 98c that extends in the horizontal direction and divides the divided area B and the divided area D, or the length in the vertical direction of the divided area B and the divided area D is calculated from an area ratio between the divided area B and the divided area D (or the ratio of the evaluating values of the player 2 and the player 4). In a case that the length in the horizontal direction of the display area in FIG. 8 is 18, and the length in the vertical direction is 10, for example, the length in the horizontal direction of the divided area A and the divided area C is ((60+40)/180)×18=10, and the length in the horizontal direction of the divided area B and the divided area D is ((40+40)/180)×18=8. Furthermore, the length of the vertical direction of the divided area A is (60/(60+40))×10=6, and the length in the vertical direction of the divided area C is (40/(60+40))×10=4. In addition, the length in the vertical direction of the divided area B and the divided area D is (40/(40+40))×10=5, respectively.

In FIG. 9, the display screen, which is in a situation that the player 1 facilitates the game further advantageously later, is displayed. In this case, the divided area A of the player 1 has become very large compared to the divided areas of other players, and therefore, the player 1 can play the game increasingly advantageously. On the other hand, the divided area B of the player 2 has become very small compared to the divided areas of other players. In addition, in this display condition, the card 100 is not displayed entirely, and therefore, the player 2 finds difficulties in looking for the card 100 to be taken, and becomes disadvantageous compared to other players.

In this embodiment, when a condition of taking the card 100 is satisfied, a predetermined value is added to the evaluating value of the player, and therefore, according to the superiority or inferiority situation of the play content (in this case, in proportion to the superiority or inferiority), the size of the divided areas of each player is changed. Therefore, by taking a brief look at the display screen, it becomes possible to easily comprehend the superiority or inferiority situation of the play content of each player.

In addition, the superiority or inferiority is reflected in the display area of each player so that it is possible to increase the amusement of the game, and for the advantageous player to obtain a sense of achievement. Furthermore, in correspondence with the change of the divided areas, the visual range of the game image is also changed so that as a result of the advantageous player being more advantageous, and the disadvantageous player being more disadvantageous, it becomes possible to affect the progress of the game, and facilitate the progress of the game by speeding up the result of the battle.

Figure 12:
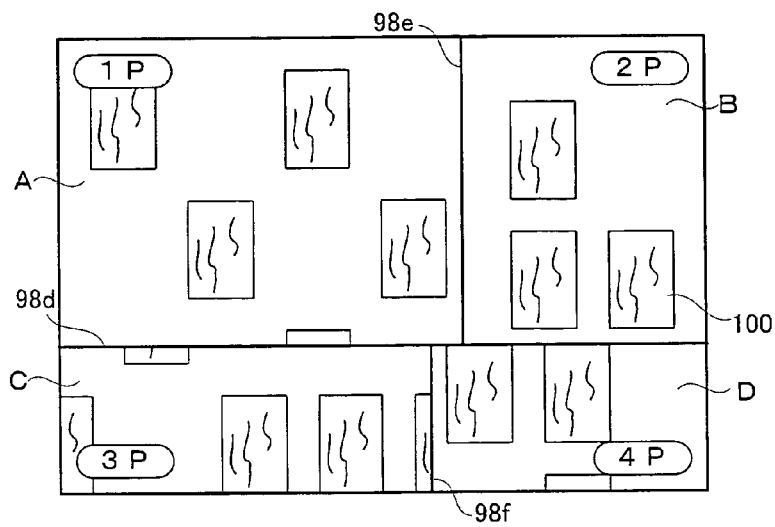
FIG. 12 is an illustrative view showing another example of the display screen in a case of 4-person play in the game apparatus of the FIG. 1 embodiment.

It is noted that in the examples in FIG. 8 and FIG. 9 in a case of the above-described 4-person play, regarding the change of the divided areas, the right/left division of the display screen, that is, the display area, is the basis. However, in another embodiment, as shown in FIG. 12, for example, an upper/lower division of the display screen may be the basis. That is, first, upper/lower dividing locations are determined, and later, right/left dividing locations in each of the upper/lower areas are determined. In this case, the location of the basic partition object 98d that divides the display screen into the upper/lower areas, or the length in the vertical direction of each divided area are calculated from a ratio between a sum of the areas of the divided area A of the player 1 and the divided area B of the player 2, and the sum of the areas of the divided area C of the player 3 and the divided area D of the player 4. In addition, the location of the partition object 98e that divides the divided area A and the divided area B, or the length in the horizontal direction of the divided area A and the divided area B are calculated from an area ratio between the divided area A and the divided area B. Furthermore, the location of a partition object 98f that divides the divided area C and the divided area D, or the length in the horizontal direction of the divided area C and the divided area D are calculated from the area ratio between the divided area C and the divided area D.

Figure 10:
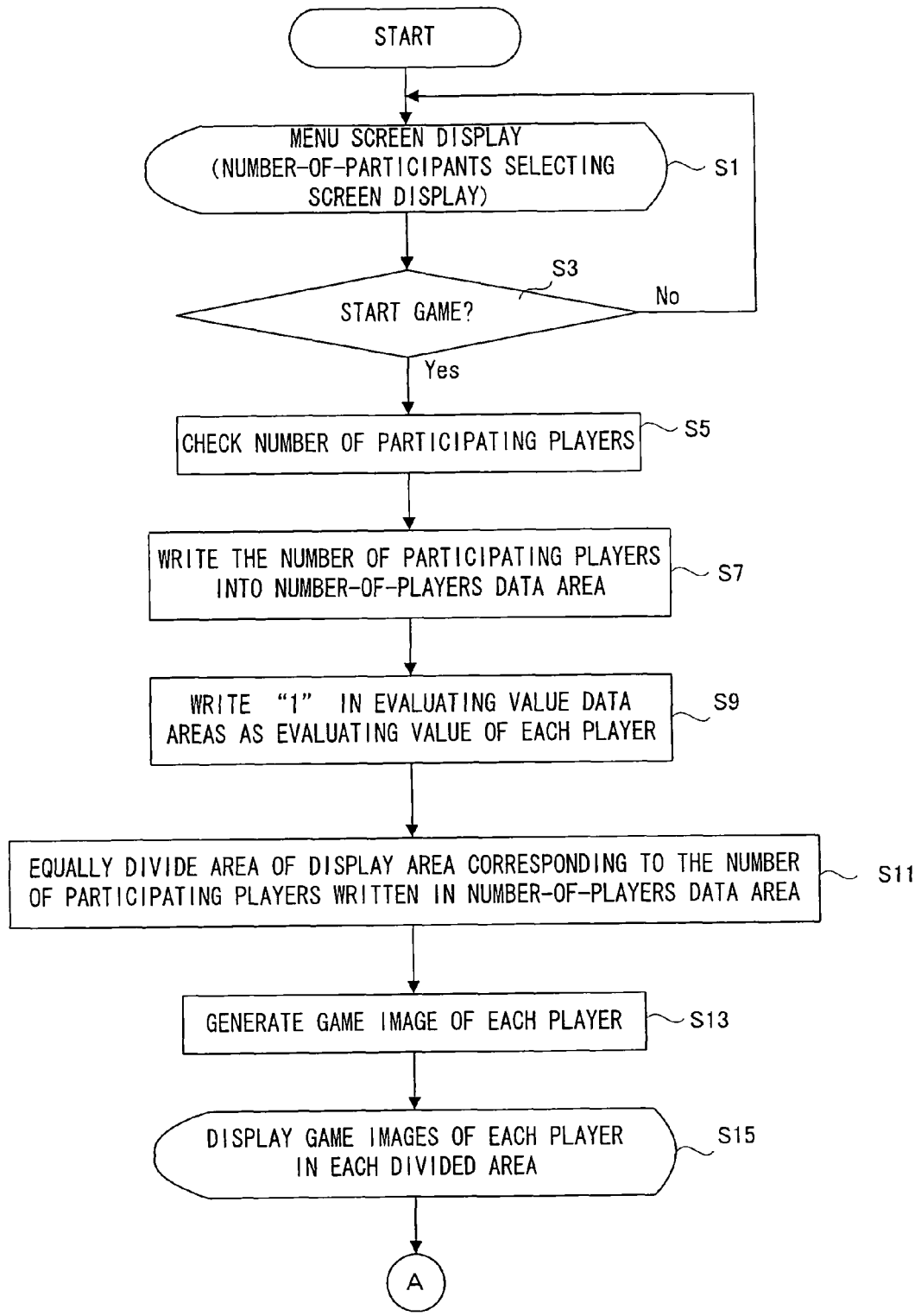
FIG. 10 is a flowchart showing one portion of one example of an operation of the game apparatus of the FIG. 1 embodiment.
Figure 11:
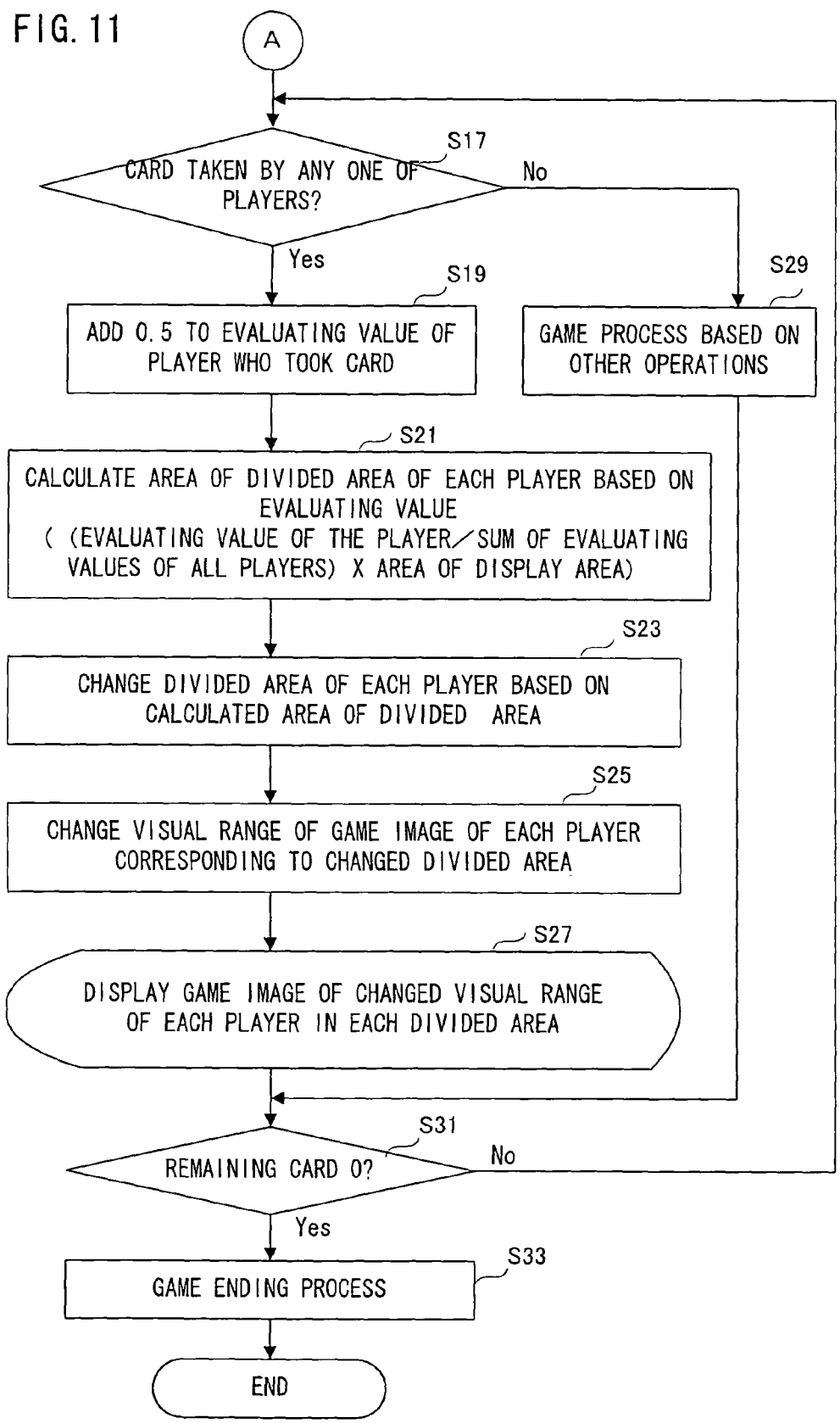
FIG. 11 is a flowchart showing a succeeding portion of FIG. 10.

The above-described operation is processed by the CPU 36 according to a flowchart shown in FIG. 10 and FIG. 11. When playing the game, the optical disk 18 is set to the game machine 12, and the power is turned on, the necessary program and the data are read out from the optical disk 18, and stored in the main memory 40 as shown in FIG. 3. The CPU 36 starts a game process, and allows a menu screen (not shown) to be displayed on the monitor 34 in a first step S1 in FIG. 10. In the step S1, a number-of-participants selecting screen associated with the menu screen is also displayed. In this number-of-participants selecting screen, the player can select or set, and so forth, the number of participants by operating the operating means 26. In addition, in the menu screen, the player can also select a kind, and etc. of the game to be played.

Next, in a step 3, the CPU 36 determines whether or not a game start is selected, that is, whether or not, out of functions of the operating means 26, a start bottom, etc., are operated by the player, for example. If "NO" in this step 3, the process returns to the step 1 so as to repeat the process.

On the other hand, if "YES" in the step S3, that is, in a case that the game start is instructed by the player, the CPU 36 checks the number of the participating players selected by the player in a step 5, and writes the number of participating players into a number-of-players data storing area 72 of the main memory 40 in a succeeding step S7. In a step S9, the CPU 36 sets "1" to the respective participating players as the evaluating value, and writes the value into an evaluating-value-data storing area 74 of the main memory 40.

Furthermore, in a step S11, the CPU 36 equally divides the area of the display area in correspondence with the number of the participating players written in the number-of-players data storing area 72. That is, the area of the divided areas of each player is calculated, and based on the area, the location of the partition object 98 or the length of the each display area, and etc. are calculated, for example. It is noted that it may be possible to have in advance the area by each number of the participating player, a dividing location, and etc., as data, and read out the data.

Next, in a step S13, the CPU 36 generates the game image to be displayed in the divided areas by each player, and allows the game image of each player to be displayed in the respective divided areas in a step S15. That is, the image data having the display screen in which the game image of each player is rendered in the divided areas is generated, and displayed on the screen of the monitor 34. This process allows the display screen at a time of starting the game as shown in FIG. 4 and FIG. 7, for example, to be displayed on the monitor 34. Furthermore, each player plays the game (in the embodiments in FIG. 4 and FIG. 7, a card-taking game) on this display screen by operating the operating means 26 of their own controller 22 as required.

Next, in a step S17 in FIG. 11, the CPU 36 determines whether or not the card 100 is taken by any one of the players. If "YES" in this step S17, the CPU 36 reads out the evaluating value data of the player who took the card 100 from the evaluating-value-data storing area 74 of the main memory 40, and adds "0.5" to this data in a step S19. A calculated new evaluating value is stored in an area for the player in the evaluating-value-data storing area 74.

In succeeding steps S21 and S23, a size change of the divided areas is performed. That is, in the step S21, the CPU 36 calculates the area of the divided areas of each player based on the evaluating value of each player. The area of the divided areas of each player is calculated by ((the evaluating value of the player/sum of the evaluating values of all players)×area of the display area) in this embodiment.

In the step S23, the CPU 36 changes the divided area of each player based on the calculated area of the divided areas. That is, as described above, for example, the display location, and etc., of the partition object 98 and each divided area are calculated by the area ratio of each divided area, and etc.

In a step S25, the CPU 36 changes the visual range of the game image to be displayed in the divided areas of each player in correspondence with the changed divided areas. Furthermore, in a step S27, the CPU 36 allows the game image of the changed visual range of each player to be displayed in each of the changed divided areas. That is, the image data having the display screen in which the changed game image of each player is rendered in the divided areas is generated, and displayed on the screen of the monitor 34. Thereby, the display screen as shown in FIG. 5 or FIG. 8 is displayed on the monitor 34, for example.

It is noted that if "NO" in the step S17, the CPU 36 executes the game process based on another player operation in a step S29. This process includes a process of a case of not taking the card 100, a process based on various operations other than taking the card, and etc. In a case that the card 100 is not taken by any player, the size of the divided areas is not changed so that the game image that conforms to the size of the divided areas at that time is generated and displayed, thus, the game is made progress.

After the process of the step S27 or the process of the step S29 is ended, the CPU 36 determines whether or not the remaining card is rendered zero (0) in a step S31. If "NO" in this step S31, that is, in a case that the card 100 still remains, the process returns to the step S17 so as to repeat the process. Therefore, as described above, for example, in a case that the player 1 continues playing the game advantageously, the display screen of a situation in which the player 1 is overwhelmingly advantageous is displayed on the monitor 34 as shown in FIG. 6 or FIG. 9.

On the other hand, if "YES" in the step S31, that is, in a case that all cards 100 are taken, the CPU 36 executes a process for ending the game in a step 33, and ends this game process.

It is needless to say that the kind of the game and a determination condition of the superiority/inferiority described here are merely one example, and may be changed as desired. In another embodiment, in a race game, the evaluating value may be set based on a time difference from the player who first passes in a check point, for example.

It is noted that in the above-described embodiment, all of the display screen (entire range) are set to the display area, and divided by each player. However, in another embodiment, the display area may be provided by sectioning the range by an appropriate shape within the display screen, and the display area is divided by each player.

An example of the display screen in a case that a circular display area is set within the display screen is shown in FIG. 13 to FIG. 16, for example. In this case, each divided area may be formed in such a manner that each divided area is rendered an angle that passes the center of the circular display area, in other words, a shape including the angle that passes the center of the circle, and the center angle of each divided area may be changed based on the evaluating value. It is needless to say that in this case, the size change of each divided area may be performed by changing the area as in each of the above-described embodiments.

In FIG. 13, a display screen at a time of starting the game in a case of a 3-person play is displayed. Regarding the game, a game, in which the player character 102 of each player defeats the enemy character 104, is shown.

In FIG. 13, each divided area A, B, or C is formed by equally dividing the center angle of the display area. More specifically, each divided area is in the form of a sector, divided by the partition object 106 that spreads from the center to its circumference, that is, corresponds to a radius of the circle, and has the center angle of 120°. It is noted that when thus playing in odd numbers, it is possible to easily perform an equal division by setting the circular display area.

In FIG. 14, the display screen in a case that the player 2 defeats an enemy character 104 from the situation of FIG. 13 is displayed. In this example, the evaluating value of the player 2 is added by "0.5", and rendered "1.5". The center angle of each divided area may be calculated by ((evaluating value of the player/sum of the evaluating values of all players)×360°). In this case, the circular display area is proportionally distributed according to the evaluating value of each player. The center angle of the divided area B becomes approximately 154', and the center angles of the divided areas A and C become approximately 103°. The partition object 106 is moved based on these center angles, and the size of the divided area is changed. Furthermore, in this example, too, similar to the above-described embodiment, the visual range of the game image of each player is changed according to the size change of each divided area.

Then, in FIG. 15, furthermore, the display image in a case that the player 2 facilitates the game advantageously is displayed. In this example, the evaluating values of the players 1, 2, and 3 are 3, 17, 15, respectively, and therefore, the center angles of the divided areas A, B, and C are approximately 43°, 245°, and 72°, respectively. Thus, the divided area B of the player 2 that facilitates the game advantageously is large so that many enemy characters 104 appear in the area. Therefore, the player 2 has more opportunities to defeat the enemy character 104, and this makes the player 2 more and more advantageous. On the other hand, the divided areas A and C of the other players 1 and 3 are small so that the enemy character 4 seldom appears, and therefore, the other players become more and more disadvantageous.

In this embodiment, similar to each of the above-described embodiments, it is possible to easily comprehend the superiority or inferiority situation of the play content of each player. In addition, the superiority or inferiority is reflected in the display area of each player so that it is possible to increase the amusement of the game. Furthermore, it is possible to affect the proceeding of the game so that it is possible to facilitate the proceeding of the game.

Figure 16:
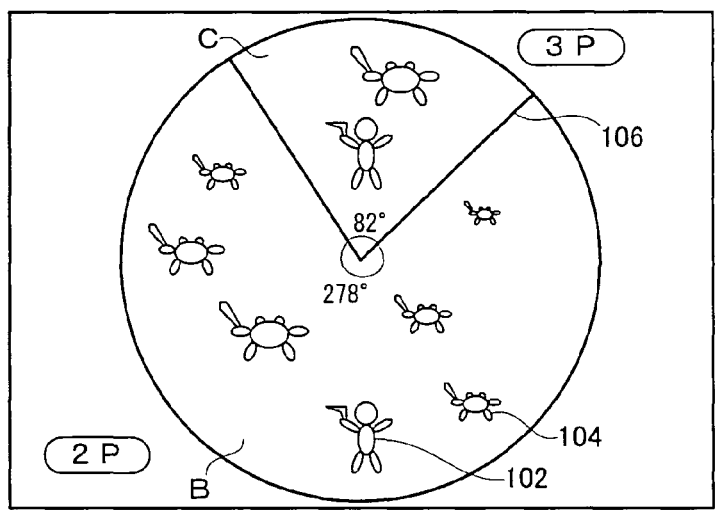
FIG. 16 is an illustrative view showing one example of a display screen that the player 1 is game-over from the FIG. 13 situation in the game apparatus in the FIG. 1 embodiment.

In addition, in this embodiment, when any one of the players is game-over, the divided area of the player is to be deleted from the display area. In FIG. 16, a display screen, in a case that the player character 102 of the player 1 is defeated by the enemy character 104 and the game is over, is displayed. In this case, the display area is re-divided by the remaining players that subtract the number of players who are game-over, and the re-divided area is allotted to the remaining players. Furthermore, the size (the center angle of the divided area) of the re-divided area allotted to the remaining players is determined (calculated) based on the evaluating value of the remaining players in this embodiment. In this example, the evaluating values of the remaining players 2 and 3 are 17 and 5, respectively. Therefore, the center angle of the divided area B is approximately 278°, and the center angle of the divided area C is approximately 82°.

Thus, when there is a player who is game-over, the display area is re-separated and allotted by the remaining players that subtract the player who is game-over so that it is possible to delete from the display area the area for the player who is game-over. Therefore, it is possible to easily comprehend the superiority or inferiority of the game of each player. In addition, the entire range of the display area for the remaining players is used so that it is possible to put the display area to an effective use, and the remaining players can concentrate on the game and further enjoy the game.

Figure 17:
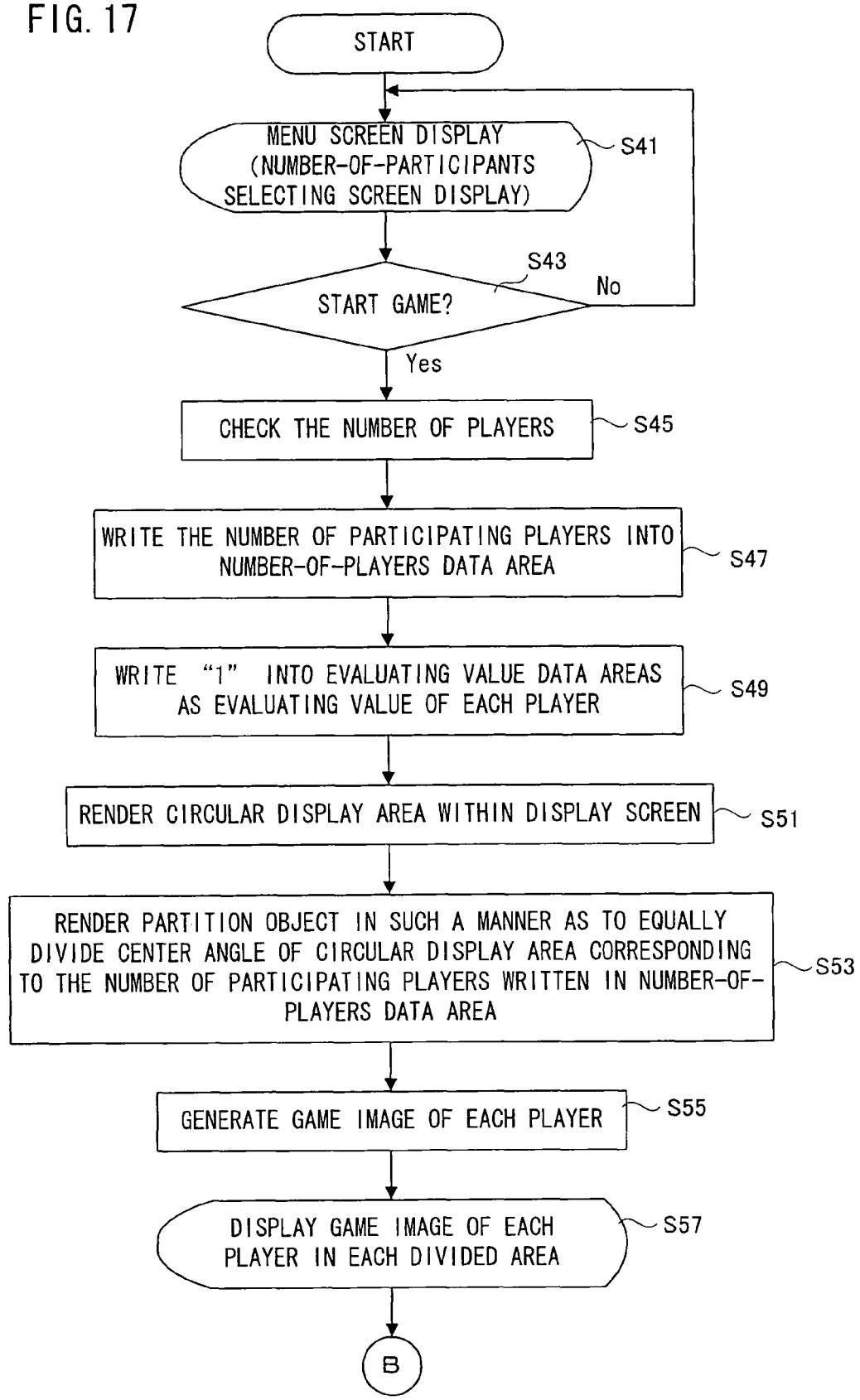
FIG. 17 is a flowchart showing one portion of another example of an operation of the game apparatus of the FIG. 1 embodiment.
Figure 18:
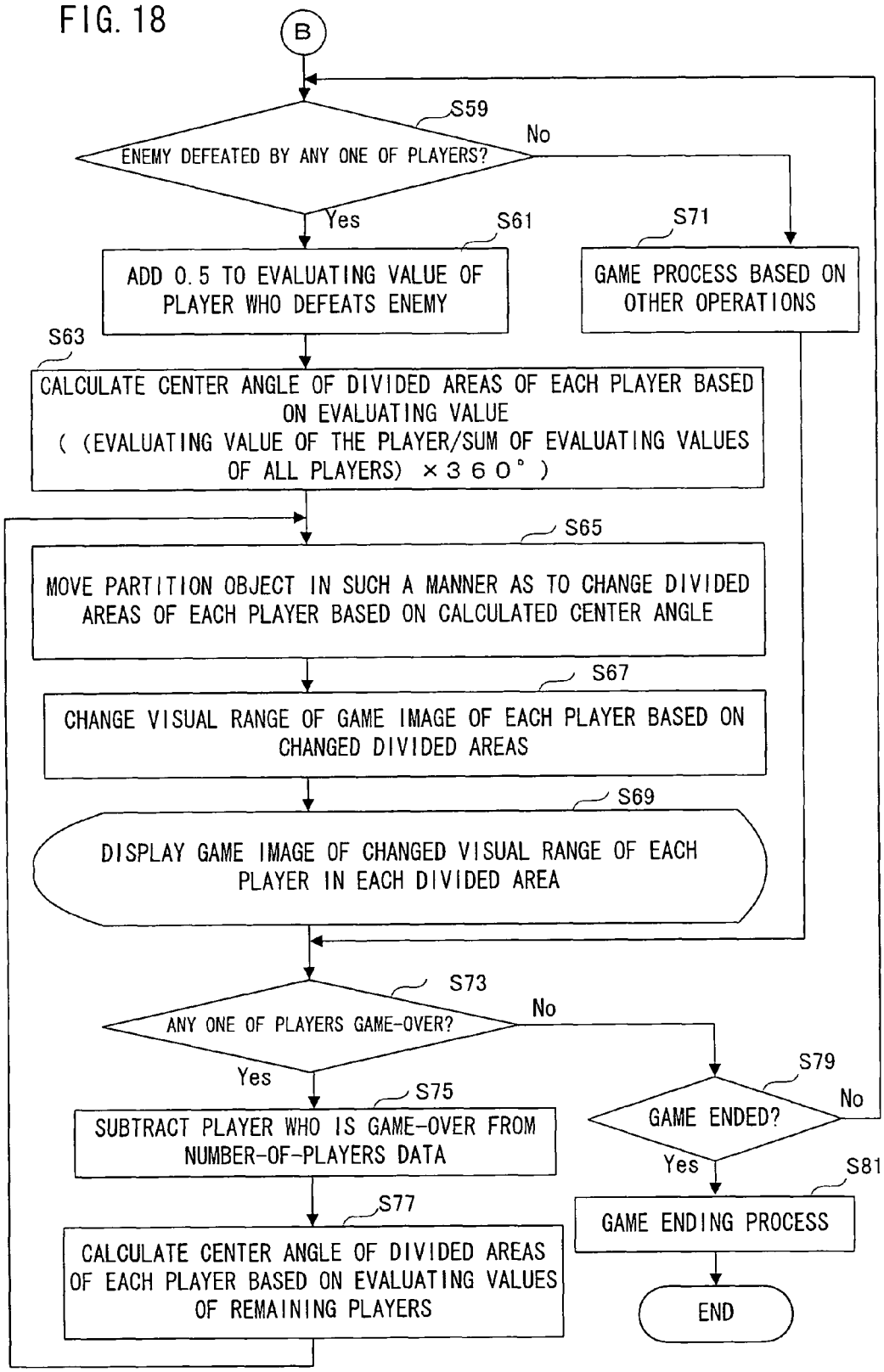
FIG. 18 is a flowchart showing a succeeding portion of FIG. 17.

The above-described operation is processed by the CPU 36 according to flowcharts shown from FIG. 17 and FIG. 18. The processes from steps S41 to S49 in FIG. 17 are processes similar to the steps S1 to S9 in FIG. 10 in the above-described embodiment so that the descriptions will be herein omitted.

In a step S51 in FIG. 17, the CPU 36 renders the circular display area within the display screen. Next, in step S53, the CPU 36 renders the partition object 106 in such a manner as to equally separate the center angle of the circular display area in correspondence with the number of the participating players written in the number-of-players data storing area 72. That is, a rendering location of the partition object, and etc., are calculated based on the center angle calculated by the equal division.

Next, the CPU 36 generates the game image by each player in step S55, and displays the game image of each player in each divided area in step S57. That is, the image data having the display screen in which the game image of each player is rendered in each divided area is generated, and displayed on the screen of the monitor 34. Thereby, the display screen as shown in FIG. 13 is displayed on the monitor 34, and each player plays the game on this display screen, for example.

Next, in a step S59 in FIG. 18, the CPU 36 determines whether or not the enemy character 104 is defeated by any one of the players. If "YES" in the step S59, the CPU 36 reads out from the evaluating-value-data storing area 74 of the main memory 40 the evaluating value of the player that defeats the enemy character, and adds 0.5 to the value in a succeeding step S61. Furthermore, the CPU 36 writes the calculated new evaluating value in the area for the player in the evaluating-value-data storing area 74.

In succeeding steps S63 and S65, the size change of the divided area is performed. That is, in the step S63, the CPU 36 calculates the center angle of the divided areas of each player based on the evaluating values of each player. The center angle of each divided area may be calculated by ((evaluating value of the player/sum of evaluating values of all players)× 360°), for example. It is noted that all players mean the remaining players who are not game-over yet at this moment, and the player who is game-over is not subjected to the calculation.

In the step S65, the CPU 36 moves the partition object 106 in such a manner as to change the divided areas of each player based on the calculated center angle. That is, the CPU 36 calculates the rendering location of the changed partition object 106.

In a step S67, the CPU 36 changes the visual range of the game image of each player based on the changed divided areas. In addition, in a step S69, the CPU 36 allows the game image of the changed visual range of each player to be displayed in each of the divided areas. That is, the image data having the display screen in which the changed game image is rendered in each divided area is generated, and displayed on the screen of the monitor 34. Thereby, the display screen as in FIG. 14 is displayed on the monitor 34, for example.

On the other hand, if "NO" in the step S59, in a succeeding step S71, the CPU 36 executes the game process based on other operations. These processes include a process in a case that the enemy character 104 is not defeated, a process based on various operations, and etc. In a case that the enemy 104 is not defeated by any one of the players, the size of the divided area is not changed so that the game image appropriate for the size of the divided area at this time is generated, and displayed on the monitor 34. Thus, the game is made progress.

When the process of the step S69 or S71 is ended, the CPU 36 determines whether or not any one of the players is game-over in a step S73. If "YES" in the step S73, that is, in a case that any one of the player characters 102 is defeated by the enemy character 104, and etc., in succeeding steps S75 and S77, the re-separating process of the display area is performed, and the size of the re-divided area is determined.

That is, in the step S75, the CPU 36 subtracts the player who is game-over from the data of the number-of-players data storing area 72 of the main memory 40. "One" is subtracted from the number-of-players data, and the number of players is rewritten to the number of the remaining players. In addition, out of the remaining player data, a flag of the player who is game-over is turned off.

Then, in a step S77, the CPU 36 re-divides the display area by the remaining players, and based on the evaluating values of the remaining players, the size (in this case, the size of the center angle) of the divided area of each player is determined. What is the remaining player is read out from the number-of-players data storing area 72, the evaluating value of the remaining players is read out from the evaluating-value-data storing area 74, and the center angle of the divided areas of each remaining player is calculated, for example.

It is noted that in another embodiment, by setting the evaluating value of the player who is game-over to zero (0), the divided areas of the player may be deleted, for example.

Upon completion of the process of this step S77, the process returns to the step S65. Therefore, the divided area of the player who is game-over is deleted from the display area, the display area is re-divided by only the remaining players, and the display screen having the re-divided area allotted to the remaining players as shown in FIG. 16, for example, is displayed on the monitor 34.

If "NO" in the step S73, the CPU 36 determines whether or not game is ended in a step S79. If "NO" in this step S79, that is, in a case that a game-ending condition is not reached, the process returns to the step S59 so as to repeat the process. Therefore, as described above, in a case that the player 2 continues playing the game advantageously, for example, the display screen of a situation in which the player 2 is overwhelmingly advantageous as shown in FIG. 15 is displayed on the monitor 34.

On the other hand, if "YES" in the step S79, the CPU 36 executes a process for ending the game in a step S81, and ends this game process.

It is noted that in each of the above-described embodiments, when a condition for assigning superiority or inferiority in the play content of the game such as when the card 100 is taken in the card-taken game or when the enemy character 104 is defeated in the shooting game, and so forth is reached, a predetermined value is added to the evaluating value of the player so as to increase the evaluating value in the step S19 (FIG. 11) or in the step S61 (FIG. 18). However, a setting manner of the evaluating value may be changed as required.

When any one of players reaches the condition, the predetermined value may be decreased and rendered small from the evaluating value of the player other than the player. In this case, the evaluating value of the player in a disadvantage situation may be rendered zero (0), and according to the changing manner (calculating manner of the area or the center angle) of the size of the divided area as described above, the divided area of the player having evaluating value zero (0) is rendered zero (0). That is, the divided area of the player having the evaluating value zero (0) is to be deleted from the display screen, and it becomes possible to forcefully bring into being game-over. Therefore, it is possible to further increase the amusement as a battle game.

In addition, besides adding the predetermined value to the evaluating value of the player who reaches the condition so as to increase the evaluating value, the predetermined value may be decreased from the evaluating value of the player other than that player so as to render the evaluating value small. In this case, a great difference occurs regarding the evaluating value between the player who reaches the condition and the other players so that it is possible to increase the amusement as the battle game, and further speed up the final outcome of the battle.

In addition, in each of the above-described embodiments, the area or the center angle of each divided area is evaluated by proportionally distributing the whole area and the whole center angle of the display area according to the evaluating value. However, the calculating manner of the size such as the area or center angle, and etc., of each divided area may be changed as required. The size of each divided area may be evaluated by unproportionally distributing the display area according to the evaluating value. In this case, contrary to each of the above-described embodiments, the more advantageous player, the smaller the size of the divided areas, thus gradually becoming disadvantageous, and the more disadvantageous the player, the larger the size of the divided areas, thus gradually becoming advantageous. That is, a balance is maintained during the process of the game, and although a difference in technique between the players is large regarding the game, it is possible to play the game in a closely contested situation, thus possible to increase the amusement of the game.

In addition, in each of the above-described embodiments, in the step S25 (FIG. 11) or the step S67 (FIG. 18), and etc., in correspondence with the change of the size of the divided areas, the visual range of the game image of each player is changed so that an aspect, for example, of the game image rendered in each divided area is changed. However, the changing manner of this game image may be changed as required. As another embodiment shown in FIG. 19, for example, the size of the object rendered in each divided area may be changed.

Figure 19:
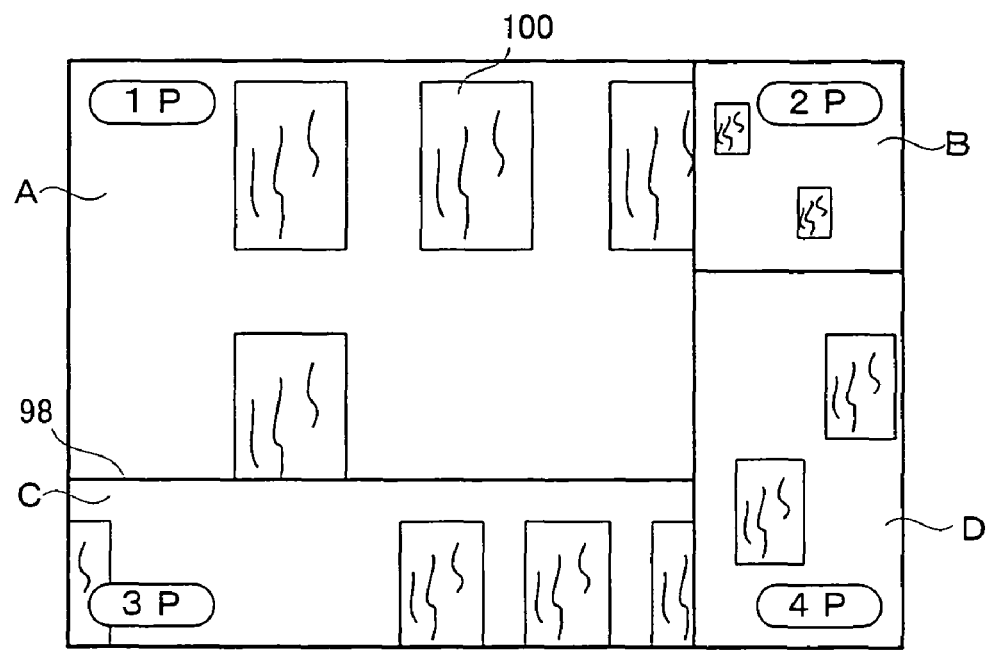
FIG. 19 is an illustrative view showing one example of a display screen in a certain situation in a case of a 4-person play in the game apparatus of the FIG. 1 embodiment.

An example in this FIG. 19 is a game in which the above-described card object 100 is taken. The card 100 has rendered in such a manner as to be reduced in size in the order of the divided areas A, C, D, and B. The card 100 rendered in the divided area A of the player 1 is magnified and large. However, the card 100 rendered in the divided area B of the player 2 is reduced and small. Therefore, the player 1 is capable of easily reading out a letter, and etc., written in the card 100. However, the player 2 finds it difficult to read out the letter and etc., written in the card 100. That is, in this circumstance, the player 1 is capable of playing the game far advantageously than the player 2. Thus, depending on the kind of the game, the object magnified/reduced according to the superiority or inferiority situation of the play is rendered in each of the divided areas, and by applying an advantage or a disadvantage to the play of the game, it becomes possible to affect the proceeding of the game, thus possible to increase the amusement of the game.

It is noted in each of the above-described embodiments, the game system 10 executed by a single game machine 12 is used. However, in another embodiment, a combined or linked game system 10 that has the game machine 12 and a plurality of hand-held game machines connected may be used.

Figure 20:
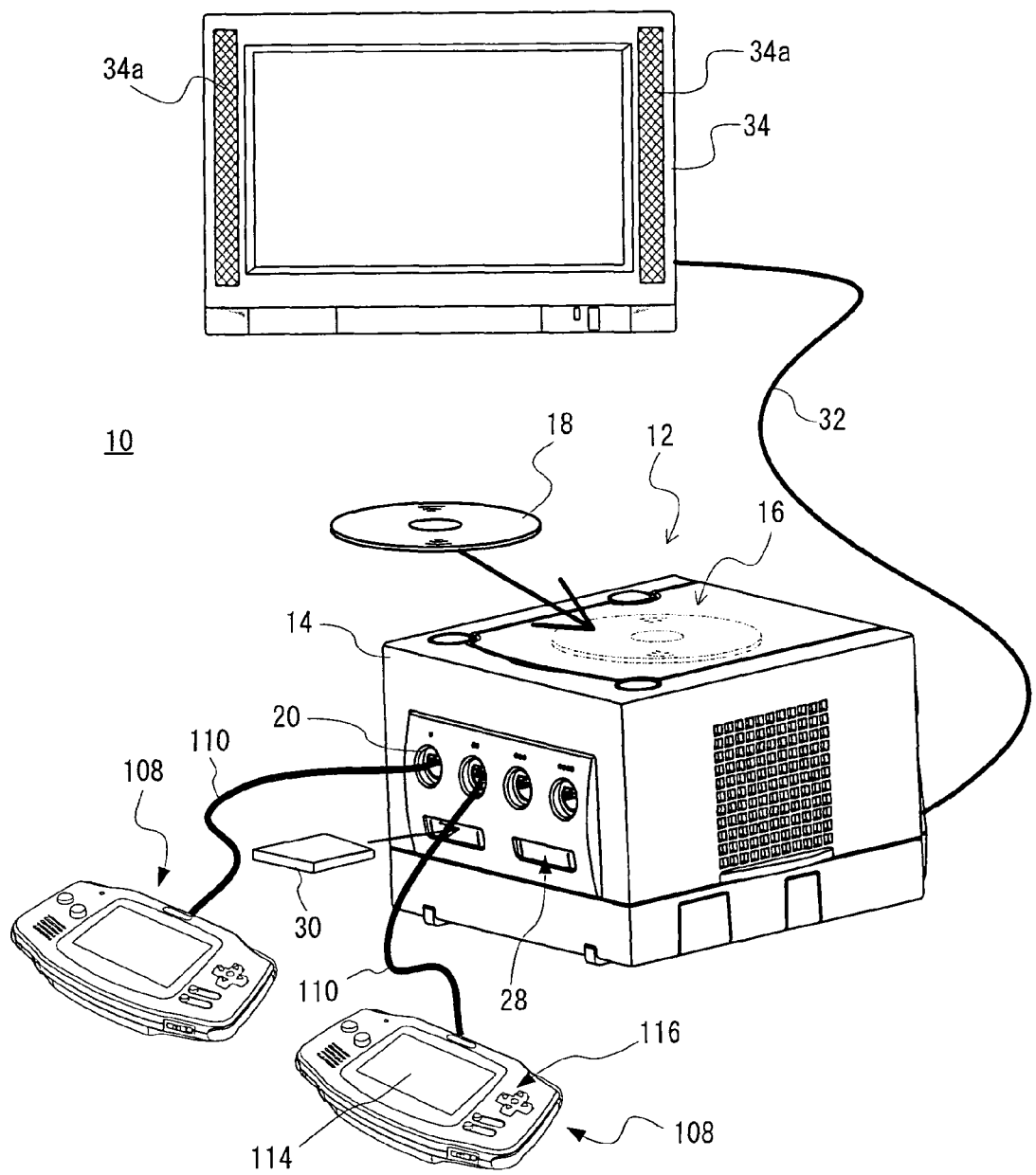
FIG. 20 is an illustrative view showing an outline of a game system of another embodiment of the present invention.

That is, the video game system 10 in another embodiment shown in FIG. 20 includes the game machine 12 and a plurality of hand-held game machines 108. The game system 10 is constructed approximately similar to the game system 10 in the FIG. 1 embodiment such as the game machine 12, the monitor 34, and etc. for example, so that the description of duplicated portions will be herein omitted.

In this embodiment, in place of the controller 22 of the FIG. 1 embodiment, a plurality of hand-held game machines 108 are connected to the game machine 12 via a communication cable 110. More specifically, a connector 20 of the game machine 12 and a connector 112 (FIG. 21) of the hand-held game machine 108 are connected by the communication cable 110. The hand-held game machine 108 may function as a controller of the game machine 12.

It is noted that in FIG. 20, a case in which the two hand-held game machines 108 are connected is shown. However, in reality, as many hand-held game machines 108 as the number of the players who participate in the game are connected. In addition, in another embodiment, the hand-held game machine 108 may be connected to the game machine 12 by another method such as wirelessly via an electromagnetic wave, for example.

At an approximately center portion of a front surface of a housing of the hand-held game machine 108, a color liquid crystal display (LCD) 114 is provided as a separate display. In this LCD 114, the game images such as the menu screen, the game space, game characters existing in the game space, a necessary message, and etc., are displayed.

In predetermined locations such as the front surface (face of surface) or an upper surface (ceiling surface), and etc., of the housing, an operating portion 116 is provided as the operating means operated by the user or the player. The operating portion 116 includes a cross button, a start button, a select button, an A button, a B button, an L button, an R button, and etc., in this embodiment. The cross button functions as a direction switch, and capable of moving the game character, a cursor, and etc., displayed on the LCD 114 and the monitor 34 as a common display in four directions by operating one of four depressing portions. The start button is used for instructing starting the game, and so forth, and the select button is used for selecting a game mode, and so forth. Primarily, the A button is used for selecting (determining), and so forth, an item designated by the cursor, and the B button is used for canceling the selected item, and so forth. In addition, the A button, the B Button, the L button, the R button, and a combination of these buttons allow the game character displayed on the LCD 114 to take arbitrary actions such as throw, capture, jump, cut by a sword, start a conversation, and so forth, which are previously set by each operation.

On a far side of the upper surface of the housing, an inserting entry not shown is provided, and a cartridge 118 (FIG. 21) is inserted into this inserting entry to be detachably attached. At an internal portion of the inserting entry, and an aperture of an edge portion of an inserting direction of the cartridge 118, the connector 120 and the connector 122 capable of making a connection therebetween are provided, respectively. This makes the cartridge 118 accessible by a CPU 124 (FIG. 21) of the hand-held game machine 108 when the connector 120 and the connector 122 are connected. Furthermore, on a near side of the upper surface of the housing, an external extension connector (communication use connector) 112 (FIG. 21) is provided. A communication cable 110 is connected to this connector 112.

In addition, below the A button and the B button in the front surface of the housing, a speaker is provided, and sounds such as a BGM during the game, a sound effect, and etc., are output. In addition, in a rear surface of a case, a battery containing box in which a battery and etc., are set is provided, and on a bottom surface of the case, a power switch, a sound volume adjusting, a headphone connecting terminal, and etc., are provided.

It is noted that the hand-held game machine 108 used in the embodiment is GameBoy Advance (Trademark) as an example, and the game machine 12 may be Nintendo GameCube (Trademark) as an example.

Figure 21:
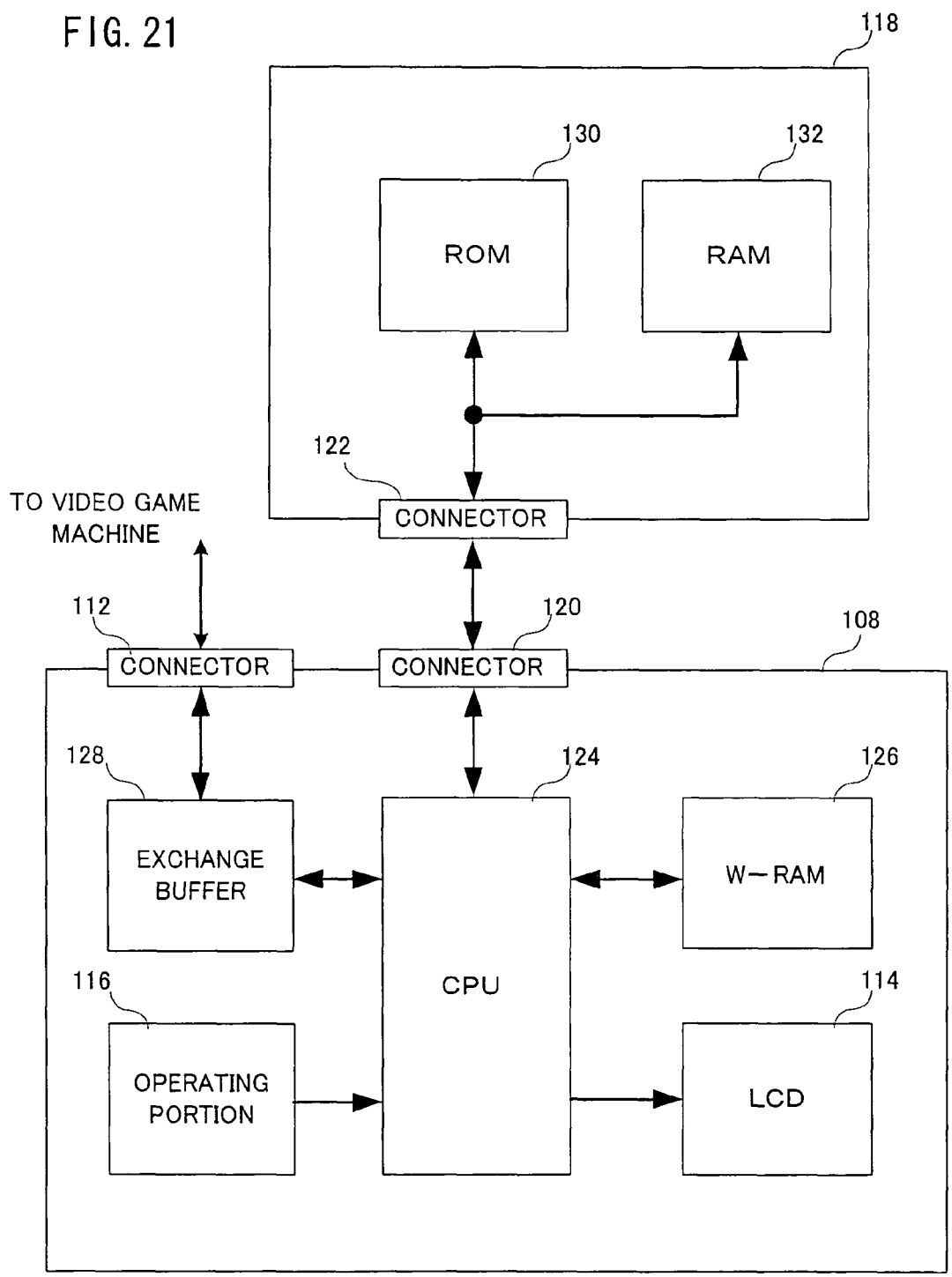
FIG. 21 is a block diagram showing one example of internal structure of a hand-held game machine of the FIG. 20 embodiment.

FIG. 21 is a block diagram showing electric structure (internal structure) of the hand-held game machine 108 and the cartridge 118. Referring to this FIG. 21, the hand-held game machine 108 includes a CPU 124. The CPU 124 is also referred to as a processor or a computer, and etc., and is responsible for entirely controlling this hand-held game machine 108. The above-described LCD 114, the operating portion 116, and the connector 120 are connected to this CPU 124 via an internal bus, and a working RAM (WRAM) 126, an exchange buffer 128, etc., are also connected.

A display signal is applied from the CPU 124 to the LCD 114, and as a result, the game image is displayed. It is noted that although not illustrated, a VRAM and an LCD controller are connected to the CPU 124, for example, and under the instruction of the CPU 124, character image data and game image data are rendered in the VRAM. In addition, the LCD controller reads out the image data rendered in the VRAM according to the instruction of the CPU 124, and displays the game image of the character, the game screen, and etc., on the LCD 114.

The operating portion 116 includes the above-described respective operating buttons, and key input information or an operating signal in response to the operation of the respective operating buttons are applied to the CPU 124. Therefore, the CPU 124 executes the process in accordance with the instruction of the user applied through the operating portion 116. In addition, the operating signal is applied to an exchange buffer 128 by the CPU 124, and also transferred to the game machine 12.

The WRAM 126 is used as a working area, a buffer area, and etc., of the CPU 124. The exchange buffer 128 is a buffer for the data exchanged between the game machine 12 and the hand-held game machine 108, and connected to the external extension connector 112. The data communication is rendered possible with the game machine 12 by connecting the connector 20 of the game machine 12 using the communication cable 110, for example.

It is noted that although not illustrated, the speaker is connected to the CPU 124 via a sound circuit, and the sound signal is applied to the sound circuit from the CPU 124. As a result, the sound such as the game music, the sound effect, and etc., are output from the speaker.

A ROM 130 and a RAM 132 are contained in the cartridge 118, the ROM 130 and the RAM 132 are connected by the bus with each other, and connected to the connector 122. Therefore, as described above, when the cartridge 118 is attached to the game machine 108, and the connector 122 and the connector 120 are connected, the CPU 124 is electrically connected to the ROM 130 and the RAM 132. Therefore, the CPU 124 is capable of reading out predetermined program data from a predetermined area of the ROM 130 and developing the data into the WRAM 126, reading out predetermined backup data from the RAM 132 and writing the data into the WRAM 126, saving (writing) the backup data generated in the WRAM 126 corresponding to a proceeding situation of the game into the predetermined area of the RAM 132 and so forth, for example.

It is noted that a flash memory, which is a nonvolatile memory, is adapted to the RAM 132. However, a ferroelectric memory (FeRAM) or an EEPROM, and etc., may be adopted as another nonvolatile memory.

Figure 22:
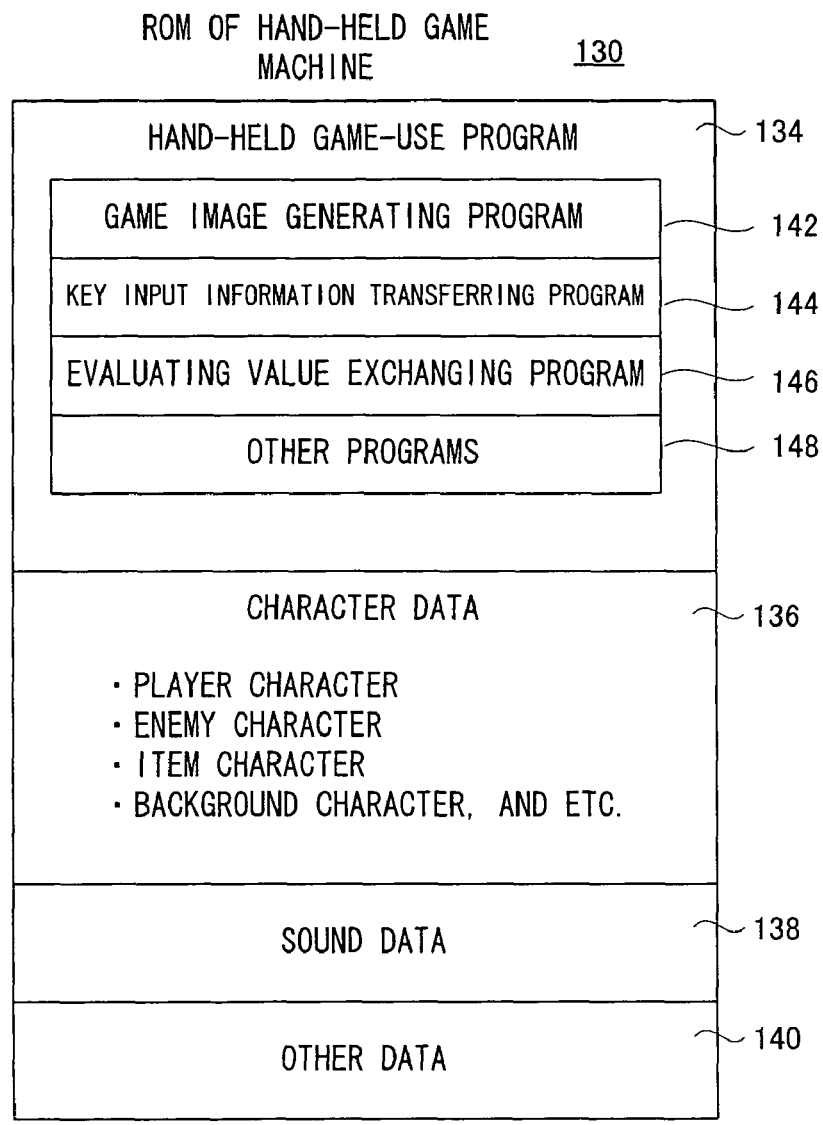
FIG. 22 is an illustrative view showing one example of a memory map of a ROM of a hand-held game machine in FIG. 21.

The ROM 130 includes a hand-held game-use program storing area 134, a character data storing area 136, a sound data storing area 138, and a storing area 140 for another data as shown in FIG. 22.

This hand-held game-use program is constructed of a game image generating program 142, a key input information transferring program 144, an evaluating value exchanging program 146, various kinds of programs 148 necessary for facilitating the game, and etc.

Herein, the key input information transferring program 144 is a program for transferring to the game machine 12 key input information or the operating signal based on the operation of the operating portion 116 by the player. In addition, the evaluating value exchanging program 146 is a program for receiving the evaluating value transferred from the game machine 12, and also for transferring the evaluating value to the game machine 12 in another embodiment described later.

In the character data storing area 136, data regarding the game character such as the player character or enemy character, an item character such as the item, a background character, and etc., are stored. In addition, in the sound data storing area 138, sound data for playing the game music such as the BGM, for example, is stored.

In this game system 10, as a result of the game screen (common screen or display screen) common to each hand-held game machine 108 being displayed on the monitor 34, which is the common display, and the game screen (separate screen or separate game image) unique to each hand-held game machine 108 being displayed on the LCD 114 of each hand-held game machine 108, an interlocking game is executed.

Each player of the hand-held game machine 108 facilitates the game by using the operating portion 116 of their own hand-held game machine 108. The key input information from the operating portion 116 is applied to the game machine 12. In the game machine 12, by processing according to the key input information, the game image displayed on the common screen is changed. Therefore, the common screen changed corresponding to the operation of the operating portion 116 of each hand-held game 108 is displayed by the monitor 34, and the separate screen changed corresponding to the operation of their own operating portion 116 is displayed by the LCD 114 of each hand-held game machine 108.

In this embodiment, too, similar to each of the above-described embodiments, in the common screen displayed on the monitor 34, the size of the divided areas for each player is changed based on the evaluating value. Therefore, it is possible to easily comprehend the superiority or inferiority situation of the play content of each player, and increase the amusement of the game.

Furthermore, in this embodiment, the evaluating values are transferred to each hand-held game machine 108 from the game machine 12, and in each hand-held game machine 108, the separate screen to be displayed on the LCD 114 changed based on the received their own evaluating values is re-generated.

Figure 23:
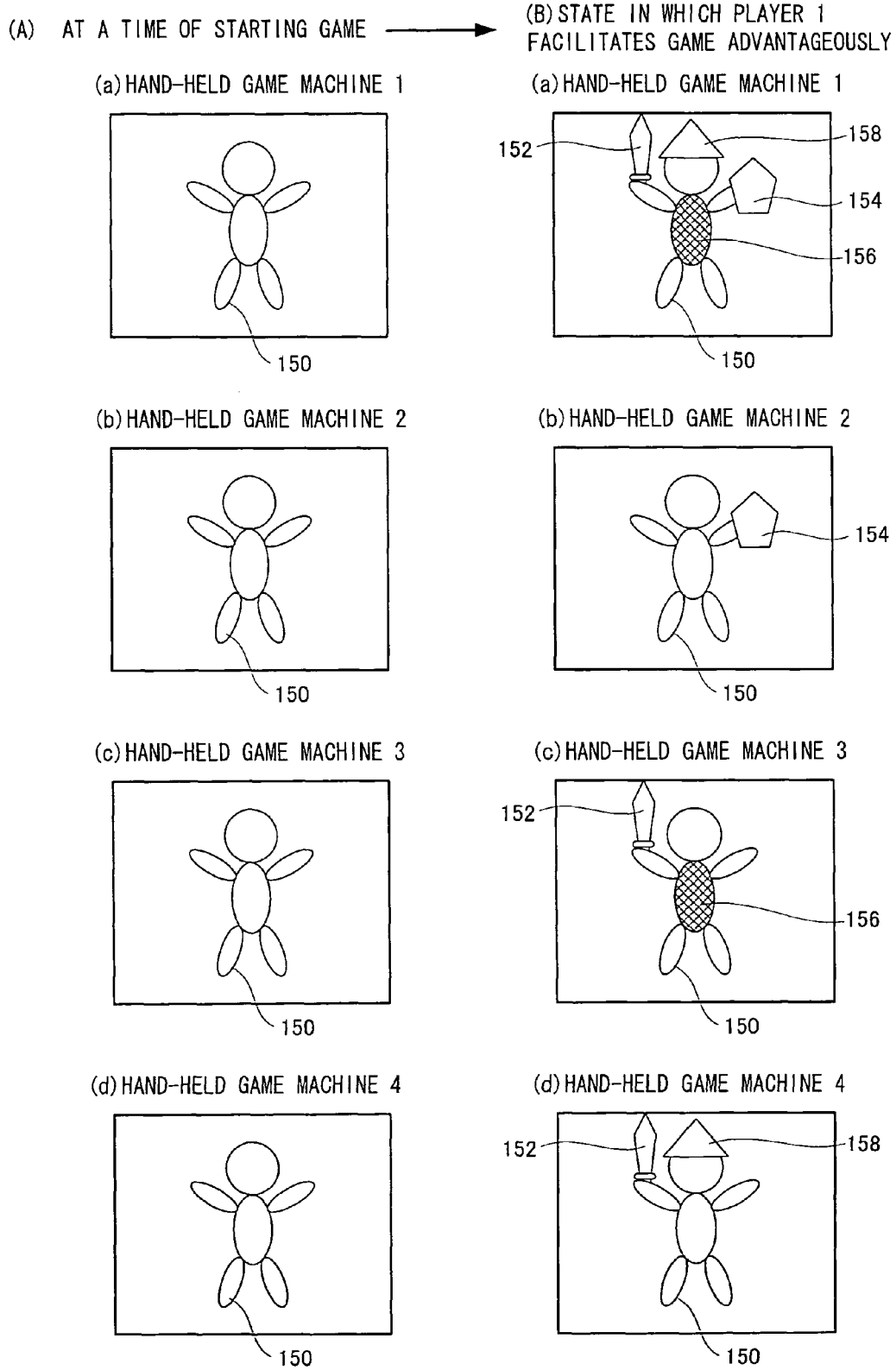
FIG. 23 is an illustrative view showing one example of a screen displayed on a separate display of the FIG. 20 embodiment, (A) shows a game starting time in a case of a 4-person play, and (B) shows a situation in a case that the player 1 facilitates the game advantageously.

In FIG. 23, an example of a transition of the separate screen displayed on the LCD 114 of each hand-held game machine 108 is displayed. In this example, an item equipping state of the player character 150 displayed in the separate display has been changed based on the evaluating value. That is, at a time of starting the game, as shown in FIG. 23 (A), a state of the player character 150 of each player is the same. However, in a case that the player 1 facilitates the game advantageously later as shown in (a) of FIG. 23 (B), only the player character 150 of the player 1 is in a full-equipped state in which the player character 150 is equipped with a sword item 152, a shield item 154, an armor item 156, and a helmet item 158. On the other hand, as shown from (b) to (d) in FIG. 23 (B), respectively, the player character 150 of the player 2 is in a state to be equipped with only the shield item 154, the player character 150 of the player 3 is in a state to be equipped with the sword item 152 and the armor item 156, and the player character 150 of the player 4 is in a state to be equipped with the sword item 152 and the helmet item 158. In this case, the player 1 is capable of playing the game advantageously in the hand-held game machine 108 compared to the other players.

According to this embodiment, the separate game image to be displayed in the separate display of the hand-held game machine 108 is changed according to the superiority or inferiority situation of the play content in the common screen, and therefore, the superiority of inferiority of the play content is also reflected in the play content of another game machine, thus possible to realize the interlocking game with an increased amusement.

Figure 24:
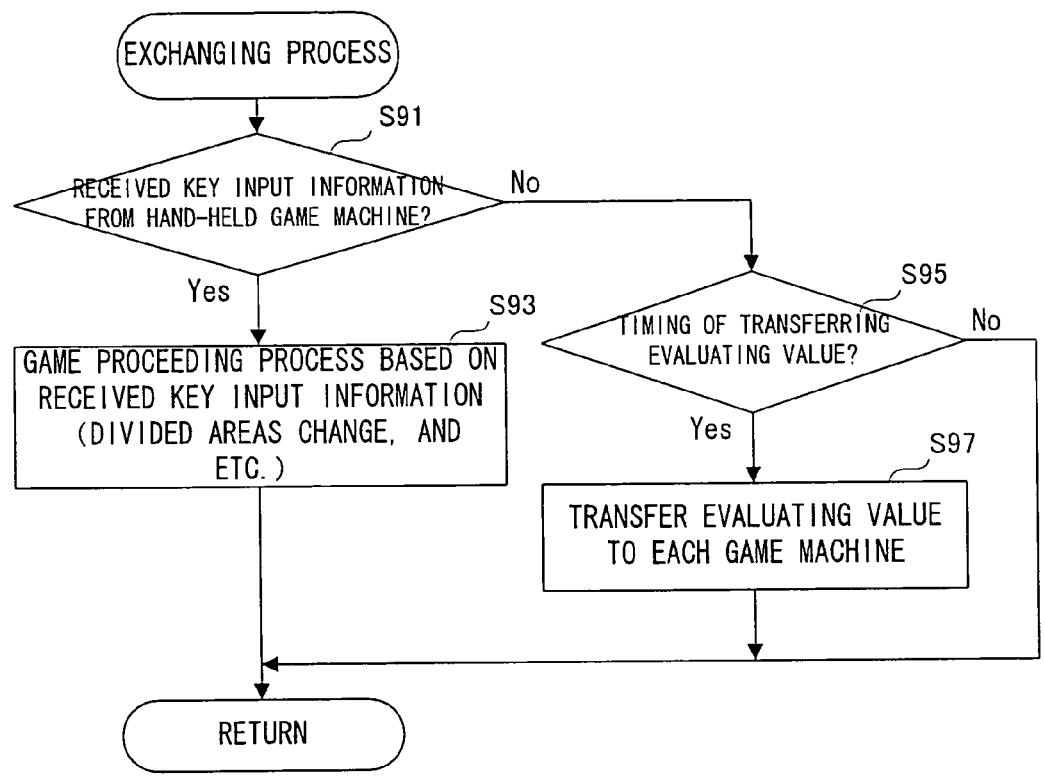
FIG. 24 is a flowchart showing one example of an exchanging process out of operations of the video game machine in the FIG. 20 embodiment.

More specifically, according to a flowchart shown in FIG. 24, the CPU 36 of the game machine 12 executes the exchanging process out of the game operations. The program of this exchanging process is a program for the interlocking game, may be executed by a main program for the game operation of the game machine 12, and executed after the step S15 in FIG. 10 and the step S57 in FIG. 17, for example.

In a step S91 in FIG. 24, the CPU 36 determines whether or not to receive the key input information (operating signal) from the hand-held game machine 108. If "YES" in this step S91, the CPU 36 executes a game proceeding process based on the received key input information in a step S93. It is noted that in this step S93, the processes from the step S17 to the step S31 in FIG. 11, the processes from the step S59 to the step S79 in FIG. 18, and etc., are executed. Thereby, the evaluating value is set according to the superiority or inferiority situation of the play content of the game in the common screen, the size of the divided areas of each player is changed based on the evaluating value, and the changed display screen (common screen) is displayed on the monitor 34, for example. In addition, if there is the player who is game-over, the display area is re-divided by the remaining players that subtract the player who is game-over, and the display screen in which the re-divided areas are allotted to the remaining players, that is, the display screen in which the area for the player who is game-over is deleted from the display area, is generated and displayed on the monitor 34.

If "NO" in the step S91, in a succeeding step S95, the CPU 36 determines whether or not an evaluating-value transferring timing. If "YES" in this step S95, the CPU 36 reads out the evaluating value from the evaluating-value-data storing area 74 and transfers the evaluating value to each hand-held game machine 108 in a step S97. It is noted that this evaluating value is set in the step S19 in FIG. 11 or the step S61 in FIG. 18, for example. In response, in each hand-held game machine 108, the game image is to be changed based on the player's own evaluating value.

It is noted that if the process of the step S93 or step S97 is ended, or "NO" in the step S95, the process returns to a flow to a main program not shown.

Figure 25:
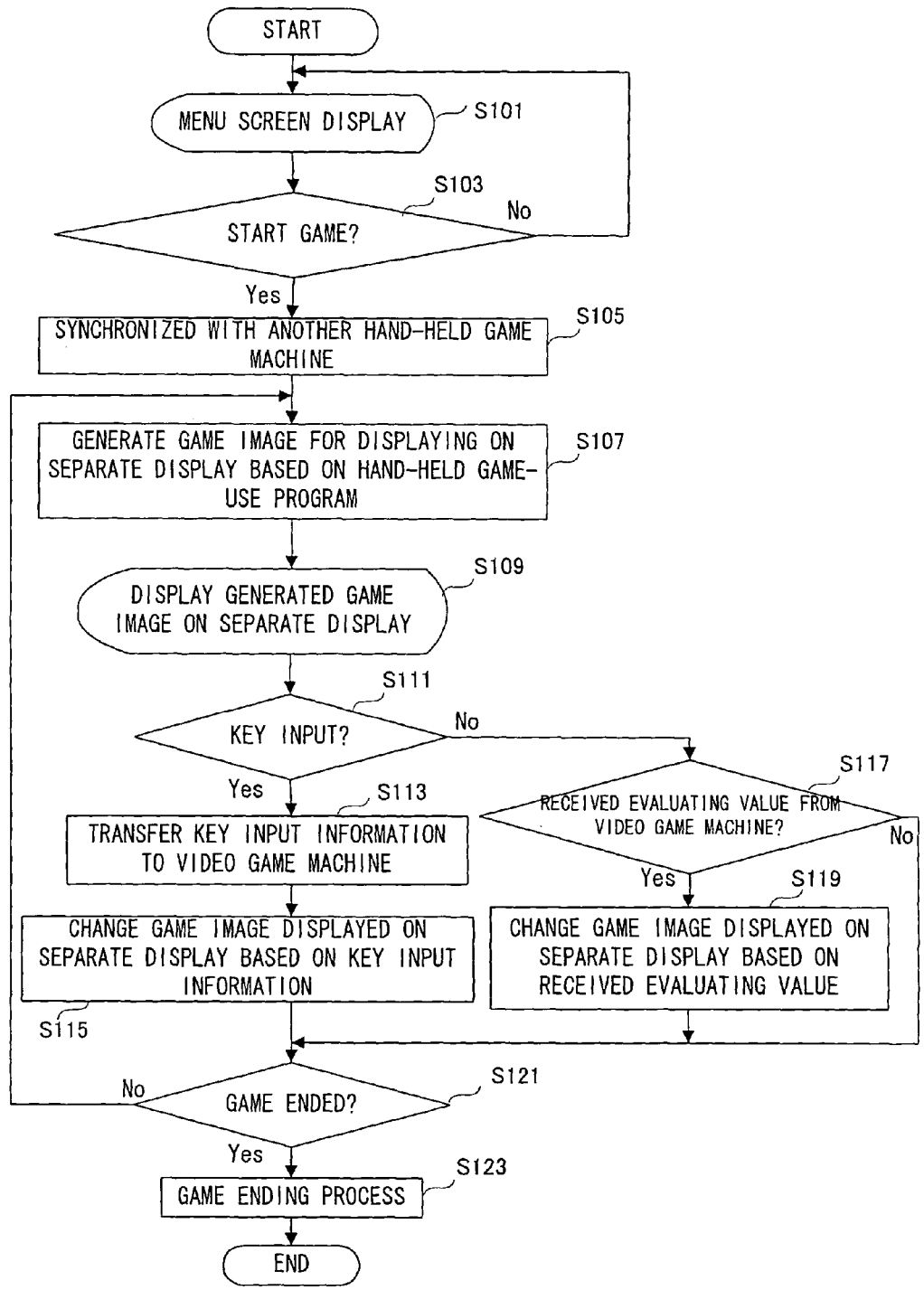
FIG. 25 is a flowchart showing one example of the operation of the hand-held game machine of the FIG. 20 embodiment.

On the other hand, an operation of the hand-held game machine 108 is illustrated in FIG. 25. A CPU 124 of the hand-held game machine 108 displays the menu screen of the hand-held game machine-use game on the LCD 114 in a step S101. Next, in a step S103, the CPU 124 determines whether or not to start the game. If "YES" in this step S103, that is, in a case of receiving the operating signal or the key input information for starting the game from the operating portion 116 by the operation by the player, for example, the process advances to a subsequent step S105 so as to establish a synchronization with another hand-held game machine 108. More specifically, as a result of identification information transferred from the game machine 12 at a time of starting the game being received, the synchronization with another hand-held game machine is established.

Next, the CPU 124 generates the game image for displaying on the LCD 114, which is the separate display, based on the hand-held game-use program developed in the WRAM 126 in a step S107, and in a step S109, displays the game image on the LCD 114. Thereby, a separate screen as shown in FIG. 23 (A) is displayed on the separate display of each hand-held game machine 108, for example.

In a step S111, the CPU 124 determines whether or not there is a key input from the operating portion 116 by the player. If "YES" in this step S111, the CPU 124 transfers the key input information or the operating signal to the game machine 12 via the exchange buffer 128 in a step S113. In the game machine 12, as described above, the game process is executed based on this key input information.

Furthermore, in a step S115, the CPU 124 changes the game image to be displayed on the LCD 114 based on the key input information. That is, the CPU 124 facilitates the hand-held game machine-use game based on the key input information so as to generate the changed game image.

On the other hand, if "NO" in the step S111, the CPU 124 determines whether or not the evaluating value is received from the game machine 12 in a step S117. If "YES" in this step S117, the CPU 124 changes the game image to be displayed on the LCD 114 based on the received evaluating value in a succeeding step S119.

When the process of the S115 or S119 is ended, or if "NO" in the step S117, the CPU 124 determines whether or not to end the game in a step S121. If "NO" in this step S121, the process returns to the step S107 so as to repeat the process. Therefore, the process of the step S109 allows the changed game image to be displayed on the LCD 114, and in a case that the player 1 plays the game advantageously, the separate screen as shown in FIG. 23 (B) is displayed on the separate displays of each hand-held game machine 108, for example.

On the other hand, if "YES" in the step S121, the CPU 124 executes a game ending process in a step S123, and ends this game process.

It is noted that in FIG. 23, the item of each player character 150 is changed based on the evaluating value as an example. However, a changing manner or method of the separate screen of the hand-held game machine 12 is changed as required. In another embodiment, a level of the player character may be changed (up/down), for example, or the player character may be evolved, or a new character may be appeared in the game space.

It is noted that in the above-described embodiment, the evaluating value is set in the game machine 12, the evaluating value is transferred to each hand-held game machine 108, and the game image to be displayed on the separate display is changed based on the received evaluating value on a hand-held game machine 108 side. However, in another embodiment, it may be possible that the hand-held game-use program is constructed including the evaluating value setting program and the evaluating value transferring program, the evaluating value of the player is set by the superiority of inferiority (in this case, a level of achieving the predetermined condition in the play of the hand-held game of each player) of the game content on the separate screen displayed on the LCD 114 of each hand-held game machine 108, and the evaluating value is transferred to the game machine 12. In addition, on the game machine 12 side, based on the received evaluating value of each player, the divided areas of the common screen to be displayed on the monitor 34, which is the common display, is changed. It is noted that it may be possible that from the hand-held game machine 108, an achieving level or a result, and etc., of the predetermined condition in the hand-held game is transferred, and the evaluating value is set based on the achieving level, and etc., on the game machine 12 side.

In addition, in each of the above-described embodiments, the cartridge 118 is attached to the hand-held game machine 108. However, the cartridge 118 may not need to be attached. However, in this case, the hand-held game-use program and the various kinds of data stored in the ROM 130 of the cartridge 118 are stored in the optical disk 18 set to the game machine 12, and downloaded into the WRAM 126 of each hand-held game machine 108.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus used in association with a display, wherein a plurality of players participate and play a game on a display screen displayed on said display, said game apparatus comprising:
   one or more game program storage areas configured to store a game program;
   an operating member operable by the player;
   number-of-players detection programmed logic circuitry configured to detect the number of players who participate in the game;
   screen partitioning programmed logic circuitry configured to partition a display area included in said display screen by the number of the participating players, and configured to form a plurality of divided areas;
   game image generating programmed logic circuitry configured to generate game images in each of said divided areas allotted to each player based on said game program and an operation from said operating member;
   evaluating value setting programmed logic circuitry configured to set an evaluating value of each player based on how well each player is doing in the game relative to the other players; and
   size changing programmed logic circuitry configured to change a size of said divided areas allotted to each player based on said evaluating value.

2. A game apparatus according to claim 1, wherein
   said screen partitioning programmed logic circuitry is configured to equally divide an area of said display area by said number of the participating players, wherein
   said size changing programmed logic circuitry is configured to change the area of said divided areas of each player.

3. A game apparatus according to claim 1, further comprising
   display area rendering programmed logic circuitry configured to render a circular display area within said display screen; wherein
   said screen partitioning programmed logic circuitry is configured to equally divide said circular display area rendered by said display area rendering programmed logic circuitry by said number of the participating players in such a manner that each divided area is rendered by an angle that passes the center thereof,
   said size changing programmed logic circuitry is configured to change a center angle of said divided areas of each player.

4. A game apparatus according to claim 1, wherein
   said game image generating programmed logic circuitry is configured to generate a changed game image according to a size change of said divided areas by said size changing programmed logic circuitry.

5. A game apparatus according to claim 4, wherein
   said game image generating programmed logic circuitry is configured to generate the game image in such a manner as to change a visual range.

6. A game apparatus according to claim 1, further comprising
   end determining programmed logic circuitry configured to determine whether there is a player who ends the game out of the participating players; wherein
   said size changing programmed logic circuitry is configured to re-divide said display area by the number of the remaining players when said end determining programmed logic circuitry determines that there is the player who ends the game, and is configured to determine a size of re-divided areas based on the evaluating value of the remaining players.

7. A game system in which a plurality of players participate and play a game, and having a video game machine connected to a common display and a plurality of hand-held game machines including a separate display connected to said video game machine, said game system comprising:
   an exchanging portion configured to exchange data between said video game machine and said hand-held game machine; and
   an evaluating value setter configured to set an evaluating value of each player based on how well each player is doing in the game relative to the other players; wherein
   said hand-held game machine, includes:
      at least one first game-program storage area configured to store a program for a player's own hand-held game;
      an operating member operable by the player;
      first game-image generating programmed logic circuitry configured to generate a separate game image to be displayed on said separate display based on said program for a player's own hand-held game or an operation from said operating member; and
   said video game machine, includes:
      at least one second game-program storage area configured to store an operating program for the video game machine and a program for an interlocking game;
      number-of-players detecting programmed logic circuitry configured to detect the number of players who participate in the game;
      screen partitioning programmed logic circuitry configured to partition a display area included in a common screen to be displayed on said common display in correspondence with the number of the participating players, and configured to form a plurality of divided areas;
      second game-image generating programmed logic circuitry configured to generate game images in each of said divided areas allotted to each player based on the program stored in said second game-program storage area or an operation from said operating member received by said exchanging portion; and
      size changing programmed logic circuitry configured to change a size of said divided areas allotted to each player based on said evaluating value set by said evaluating value setter.

8. A game system according to claim 7, wherein
   said evaluating value setter comprises evaluating value setting programmed logic circuitry and is provided in said video game machine,
   said first game-image generating programmed logic circuitry is configured to re-generate said separate game images based on the evaluating value of the player received from said video game machine by said exchanging portion.

9. A game apparatus for use with a display, and in which a plurality of players participate and play a game on a display screen displayed on said display, said game apparatus comprising:
   at least a first game program storage configured to store a game program;
   an operating member operable by the player;
   number-of-players detecting programmed logic circuitry configured to detect the number of players who participate in the game;
   screen partitioning programmed logic circuitry configured to partition a display area included in said display screen by the number of the participating players, and configured to form a plurality of divided areas;
game image generating programmed logic circuitry configured to generate game images in each of said divided areas allotted to each player based on said game program and an operation from said operating member;
end determining programmed logic circuitry configured to determine whether there is a player who ends the game out of the participating players; and
re-partitioning programmed logic circuitry configured to re-partition said display area by the number of the remaining players when said end determining programmed logic circuitry determines that there is the player who ends the game, and configured to allot the re-divided areas to the remaining players in accordance with how the remaining players are performing in the game relative to one another.

10. A game system in which a plurality of players participate and play a game, and having a video game machine connected to a common display and a plurality of hand-held game machines including a separate display connected to said video game machine, said game machine comprising:
exchanging programmed logic circuitry configured to exchange data between said video game machine and said hand-held game machine; wherein
said hand-held game machine, includes:
at least a first game-program storage area configured to store a program for a player's own hand-held game;
an operating member operable by the player;
first game-image generating programmed logic circuitry configured to generate a separate game image to be displayed on said separate display based on said program for a player's own hand-held game or an operation from said operating member; and
said video game machine, includes:
at least a second game-program storage area configured to store an operating program for the video game machine and a program for an interlocking game;
number-of-players detecting programmed logic circuitry configured to detect the number of players who participate in the game;
screen partitioning programmed logic circuitry configured to partition the display area included in a common screen to be displayed on said common display in correspondence with the number of the participating players, and configured to form a plurality of divided areas;
second game-image generating programmed logic circuitry configured to generate game images in each of said divided areas allotted to each player based on the program stored in said second game-program storage area or an operation from said operating member received by said exchanging portion;
end determining programmed logic circuitry configured to determine whether there is a player who ends the game out of the participating players; and
re-partitioning programmed logic circuitry configured to re-partition said display area by the number of the remaining players when determined by said determining portion that there is the player who ends the game, and configured to allot the re-divided areas to the remaining players in accordance with how the remaining players are performing in the game relative to one another.

11. A non-transitory computer readable storage medium that stores an executable game program configured to change a plurality of divided areas on a display screen in a game apparatus that is provided to be associated with said display, and a plurality of players participate in a game and operate an operating member so as to play the game on said display screen displayed on said display, said game program allows a computer of said game apparatus to execute steps comprising:
detecting the number of players who participate in the game;
partitioning the display area included in said display screen by the number of the participating players, and forming said plurality of divided areas;
generating game images in each of said divided areas allotted to each player based on an operation from said operating member;
setting an evaluating value of each player based on how well each player is doing in the game relative to the other players; and
changing a size of said divided areas allotted to each player based on said evaluating value.

12. A non-transitory computer readable storage medium that stores a game program configured to change a plurality of divided areas on a common screen in a game system having a video game machine connected to a common display, and a plurality of hand-held game machines including an operating member operable by a player and a separate display connected to said video game system, wherein a plurality of players participate and play the game on said common screen displayed on said common display and a separate screen displayed on said separate display,
said game program allows a computer of said hand-held game machine to execute steps comprising:
transferring an operation from said operating member to said video game machine; and
generating a separate game image to be displayed on said separate display based on the operation from said operating member; and
said game program allows a computer of said video game machine to execute steps comprising:
receiving an operation from said hand-held game machine;
detecting the number of the players who participate in the game;
partitioning a display area included in said common screen in correspondence with the number of the participating players, and forming said plurality of divided areas;
generating game images in each of said divided areas allotted to each player based on an operation received by said operation receiving step;
setting an evaluating value of each player based on how well each player is doing in the game relative to the other players; and
changing a size of said divided areas allotted to each player based on said evaluating value.

13. A non-transitory computer-readable storage medium that stores an executable game program configured to change a plurality of divided areas on a display screen in a game apparatus for use with a display, and in which a plurality of players participate in a game and operate an operating unit so as to play the game on said display screen displayed on said display, said game program enabling a computer of said game apparatus to execute steps comprising:
detecting the number of players who participate in the game;
partitioning a display area included in said display screen by the number of the participating players, forming said plurality of divided areas;

generating game images in each of said divided areas allotted to each player based on an operation from said operating unit;

determining whether there is a player who ends the game out of the participating players; and re-partitioning said display area by the number of the remaining players when determined by said determining step that there is a player who ends the game, and allotting the re-divided areas to the remaining players in accordance with how the remaining players are performing in the game relative to one another.

14. A non-transitory computer-readable storage medium that stores an executable game program configured to change a plurality of divided areas on a common screen in a game system having a video game machine connected to a common display, and a plurality of hand-held game machines including an operating unit operable by a player and a separate display connected to the video game machine, wherein a plurality of players participate and play the game on said common screen displayed on said common display and a separate screen displayed on said separate display, said game program enabling a computer of said game apparatus to execute steps comprising:

transferring an operation from said operating unit to said video game machine; and generating a separate game image to be displayed on said separate display based on the operation from said operating unit; and said game program enables a computer of said video game machine to execute steps comprising:

receiving an operation from said hand-held game machine;

detecting the number of players who participate in the game;

partitioning a display area included in said common screen in correspondence with the number of the participating players, and forming said plurality of divided areas;

generating game images in each of said divided areas allotted to each player based on an operation received by said operation receiving step;

determining whether there is the player who ends the game out of the participating players; and re-partitioning said display area by the number of the remaining players when determined by said determining step that there is a player who ends the game, and allotting the re-divided areas to the remaining players in accordance with how the remaining players are performing in the game relative to one another.

15. A method of representing relative game progress in a competitive game displayed on at least one display screen, the method comprising:

partitioning the display screen area into plural partitions;

assigning each partition to a different player in one-to-one correspondence so that each player is assigned exactly one partition;

determining, as the game progresses, how each player is performing relative to the other players, based on game factors other than the size of a player's partition; and dynamically changing the relative sizes of the display screen partitions, based on how each player is performing in the game as determined by the determining, such that the players are given a visual indication of their relative performance within the game through the size of the display screen area allocated to them, such that a first player who is beating a second player in the game is allocated a larger display screen partition than the second player.

* * * * *